(12) United States Patent
Batra

(10) Patent No.: US 10,692,128 B2
(45) Date of Patent: Jun. 23, 2020

(54) SMART SHOPPING LIST SYSTEM

(71) Applicant: PAYPAL, INC., San Jose, CA (US)

(72) Inventor: Gautam Batra, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 1051 days.

(21) Appl. No.: 14/586,541

(22) Filed: Dec. 30, 2014

(65) Prior Publication Data

US 2016/0189276 A1 Jun. 30, 2016

(51) Int. Cl.
*G06Q 30/00* (2012.01)
*G06Q 30/06* (2012.01)
*G06Q 20/32* (2012.01)

(52) U.S. Cl.
CPC ..... *G06Q 30/0633* (2013.01); *G06Q 20/3224* (2013.01); *G06Q 30/0639* (2013.01)

(58) Field of Classification Search
None
See application file for complete search history.

(56) References Cited

U.S. PATENT DOCUMENTS

| | | | | |
|---|---|---|---|---|
| 7,580,699 B1* | 8/2009 | Shaw | ............. | G06Q 20/102 |
| | | | | 455/410 |
| 9,324,106 B2* | 4/2016 | Argue | ............. | G06Q 30/0639 |
| 2004/0217166 A1* | 11/2004 | Myers | ............. | G06Q 20/343 |
| | | | | 235/383 |
| 2008/0059341 A1* | 3/2008 | Narayanaswami | .. | G06Q 10/087 |
| | | | | 705/28 |
| 2010/0030624 A1* | 2/2010 | Vanska | ............. | G01C 21/20 |
| | | | | 705/14.64 |
| 2013/0103539 A1* | 4/2013 | Abraham | ............. | G06Q 30/0633 |
| | | | | 705/26.8 |
| 2014/0139637 A1 | 5/2014 | Mistry et al. | | |
| 2014/0172621 A1* | 6/2014 | Vittolia | ............. | G06Q 30/0631 |
| | | | | 705/26.7 |
| 2014/0379480 A1 | 12/2014 | Rao et al. | | |
| 2015/0154674 A1* | 6/2015 | Todasco | ............. | G06Q 30/0613 |
| | | | | 705/26.41 |

(Continued)

OTHER PUBLICATIONS

"Karmouche, Amine, Aisle-level Scanning for Pervasive RFID-based Shopping Applications, Feb. 7, 2013, IEEE Xplore, pp. 1-4" (Year: 2013).*

*Primary Examiner* — William J Allen
*Assistant Examiner* — Maria S. P. Heath
(74) *Attorney, Agent, or Firm* — Haynes and Boone LLP

(57) ABSTRACT

A system provider shopping list display device, including a shopping list support engine to receive user location information from a plurality of beacon devices that indicates a location of a user at a merchant physical location and to retrieve shopping list information that includes a plurality of products that are available in a first order. The shopping list support engine is further configured to: receive a product removal input that indicates the user has removed a first product, remove the first product in the shopping list following the product removal input, and provide the plurality of the products remaining in the shopping list in a second order based at least in part on locations of the plurality of products remaining and a location of the user after the first product is removed, and cause at least one of the plurality of the products in the second order to be displayed.

20 Claims, 17 Drawing Sheets

(56) References Cited

U.S. PATENT DOCUMENTS

2015/0227890 A1\* 8/2015 Bednarek ......... G06Q 10/08355
  705/26.81
2015/0317708 A1\* 11/2015 Eramian ............ G06Q 30/06
  705/26.8
2016/0063610 A1\* 3/2016 Argue ............... G06Q 30/0639
  705/26.8

\* cited by examiner

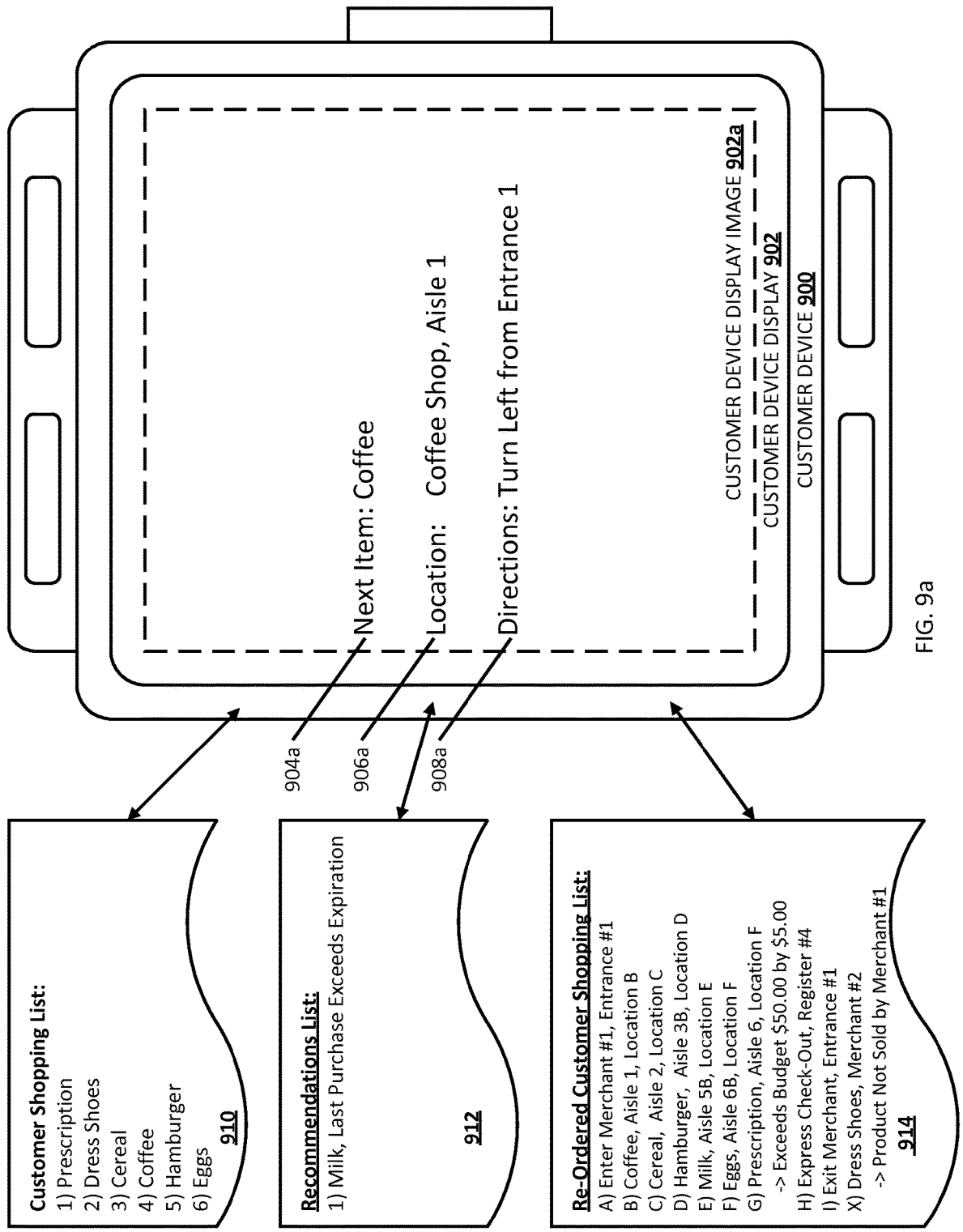

SMART SHOPPING LIST SYSTEM

BACKGROUND

Field of the Invention

The present disclosure generally relates to mobile devices, and more particularly to a smart shopping list system for mobile devices.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Some payment service providers provide online and mobile payment services for merchants with physical merchant locations and their customers. Consumers may have shopping lists on their mobile devices that they use to remind them which items and services to purchase during shopping trips to the merchants with merchant physical locations, and may utilize the online and/or mobile payment services provided by the payment service providers discussed above to make those purchases. However, such services are limited to the purchase transactions conducted between customers and merchants, and thus the shopping lists are not available to the payment service providers and/or the merchants for assisting the customer during the shopping trip. In addition, the shopping lists may include many items and services that may be listed in any order, and thus only a portion of the shopping list may be displayed on the mobile device at any one time making it difficult to complete a shopping trip in a timely or efficient manner.

Thus, there is a need for an improved shopping list system.

BRIEF DESCRIPTION OF THE FIGURES

FIG. 9a is a front view illustrating an embodiment of a customer device displaying an image of a product, a product location of the product, and directions to the product;

Figure 1:
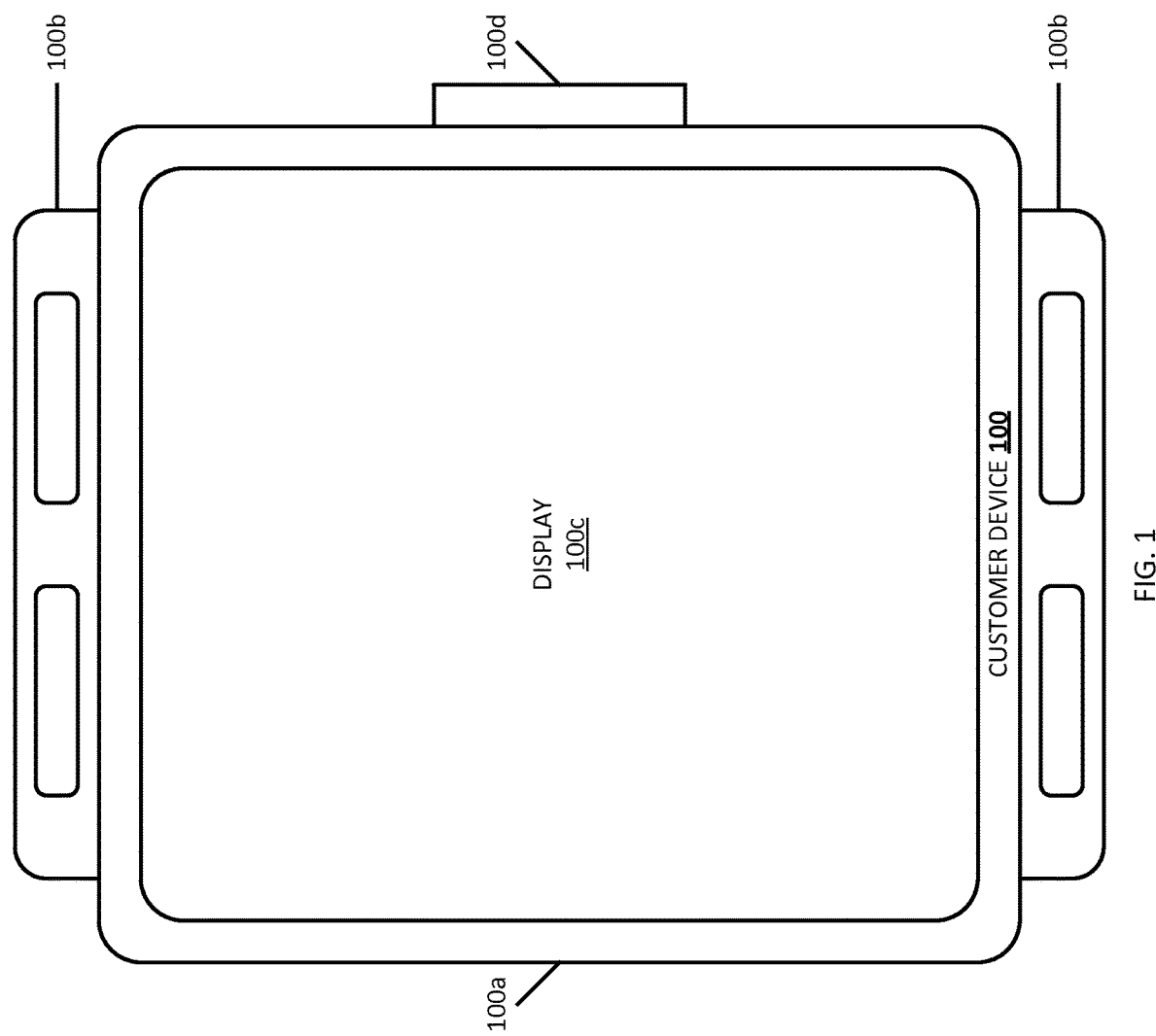
FIG. 1 is a front perspective view illustrating an embodiment of a customer device.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for re-ordering a shopping list on a customer mobile device to allow a customer to be more efficient with shopping at a merchant physical location. The customer device receives product location information from at least one beacon device at the merchant physical location that identifies the locations of products that are available at the merchant physical location, shopping list information from a shopping list database that includes the shopping list having a subset of the products in a first order, and customer location information from a location determination device that indicates a location of the customer during a customer shopping session. The customer device may provide a re-ordered shopping list having the subset of the products in the shopping list information in a second order based at least in part on the relative location of a location of the customer received from the location determination device and each of the subset of the products in the second order of the re-ordered shopping list within the merchant physical location. The customer device may then cause a first product provided in the second order of the re-ordered shopping list and the location of the first product in the merchant physical location to be displayed on the customer device that allow the customer to locate and acquire the first product that is closest to the customer. Displaying the first product and the location of the first product rather than the complete re-ordered shopping list of products and their locations, may allow the information to be displayed on customer devices having small display screens, such as a smart watch, and other wearable devices. The customer device may then cause the first product to be removed from display on the customer device following a product removal input. For example, the customer may make a finger swipe action on a touch screen of the customer device that is detected as the product removal input by the customer device. Other ways of a product removal input include detecting that the product has been placed into a customer shopping cart, such as through beacons, RFID communication, barcode or image scanning of the product, and voice command (e.g., the customer saying "Remove Item X"). In response to the product removal input, the customer device may then cause a second product provided in the second order of the re-ordered shopping list and the location of the second product to be displayed on the customer device that allow the customer to locate and acquire the next product that is closest to the customer. Thus, each time an item from the shopping list is removed, the remaining items on the list may be reordered based on the current location of the customer, resulting in a more efficient shopping experience for the customer.

Referring now to FIG. 1, an example of a customer device 100 is provided that, in the illustrated embodiment, is a wearable smart watch including a touch screen input device and an input dial that allows the functionality as discussed below. However, as discussed below, the customer device/wearable smart watch may be a variety of other wearable and non-wearable portable/mobile customer devices known in the art. Furthermore, in some embodiments, the functionality discussed below with regard to the customer device may be provided by one or more customer devices and/or external systems while remaining within the scope of the present disclosure. The customer device 100 includes a chassis 100a having a wristband 100b, a display 100c, and an input device including the display 100c and an input dial 100d.

Figure 2:
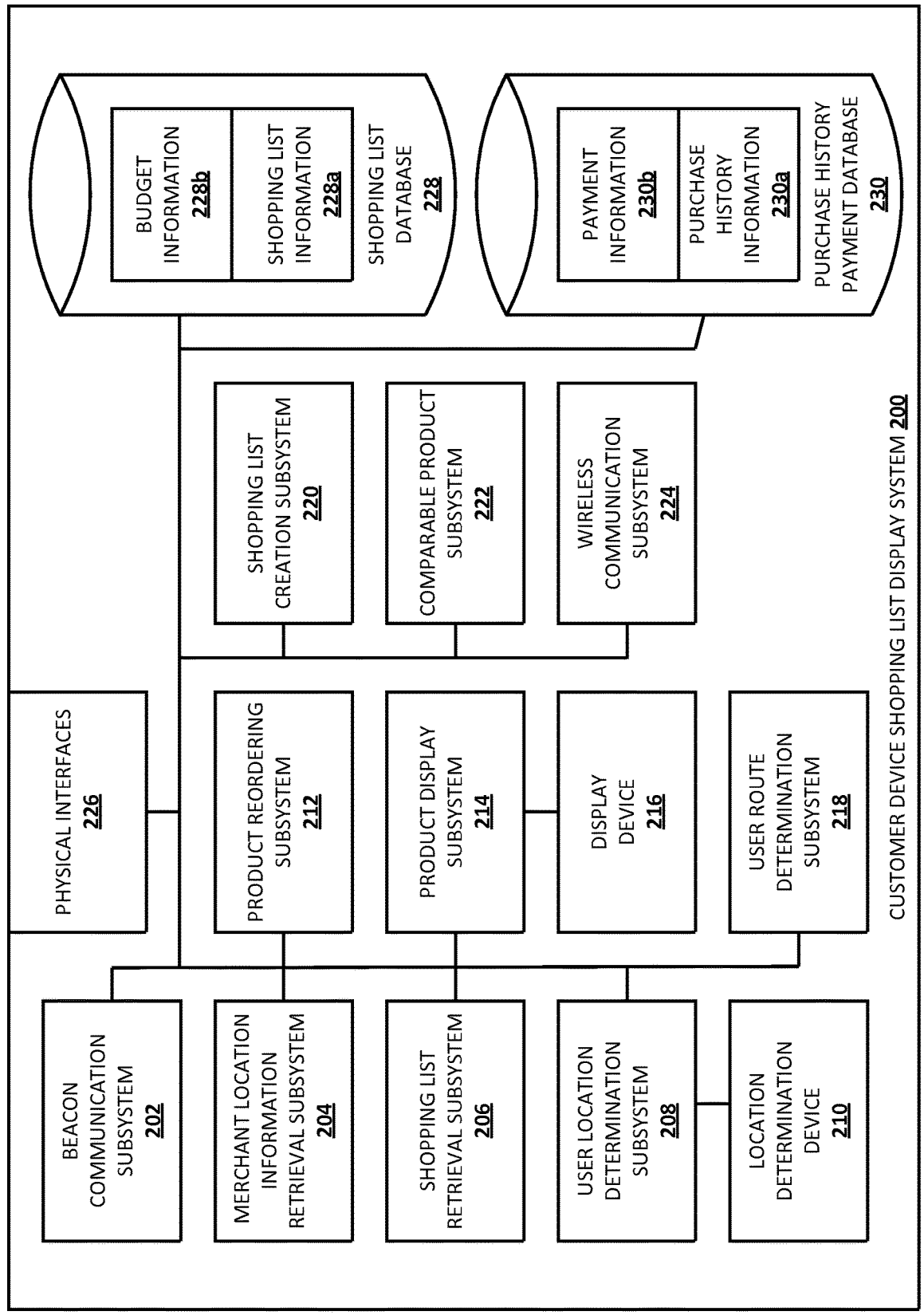
FIG. 2 is a schematic view illustrating an embodiment of a customer device shopping list display system.

Referring now to FIG. 2, an embodiment of a customer device shopping list display system 200 is illustrated that may be the customer device 100 discussed above with reference to FIG. 1. As such, the components included in and/or provided by the customer device shopping list display system 200 discussed below may be housed in the chassis 100a of the customer device shopping list display system 200. The customer device shopping list display system 200 may include a hardware processing system (not illustrated) and a non-transitory, computer-readable medium or memory system (not illustrated) that includes instructions that, when executed by the hardware processing system, cause the hardware processing system to configure the customer device shopping list display system 200 that performs the functionality of the customer device shopping list display subsystems taught herein. The customer device shopping list display system 200 may also include a beacon communication subsystem 202, a merchant location information retrieval subsystem 204, a shopping list retrieval subsystem 206, a user location determination subsystem 208 having a location determination device 210, a product reordering subsystem 212, a product display subsystem having a display device 216, a user route determination subsystem 218, a shopping list creation subsystem 220, and a comparable product subsystem 222 that are coupled to each other through, for example, a bus or other connection between the hardware processing system and the customer device shopping list display subsystems. The location determination device 210 may be, for example, a Global Positioning System (GPS) device, a beacon triangulation device, and/or a variety of other location determination devices known in the art. The display device 216 may be, for example, a Liquid Crystal Display (LCD) device, a touch-screen display device, and/or a variety of other display devices known in the art. The customer device shopping list display system 200 may also include one or more wireless communication subsystems 224 such as, for example, a Wi-Fi communication system, a Bluetooth communication system or Bluetooth Low Energy (BLE) communication system, a Near Field Communication (NFC) system, a beacon communication system, and/or a variety of other wireless communications systems known in the art that are coupled to the customer device shopping list display subsystems through, for example, a bus or other connection between the hardware processing system and the wireless communication subsystem 224. The customer device shopping list display system 200 may also include one or more physical interfaces 226 (e.g., customer device connectors (not shown)) that are coupled to the customer device shopping list display subsystems through, for example, a bus or other connection between the hardware processing system and the one or more physical interfaces 226.

The customer device shopping list display system 200 may also include a shopping list database 228 that stores shopping list information 228a and budget information 228b, and a purchase history database 230 that stores purchase history 230a, discussed in further detail below, and that are coupled to the customer device shopping list display subsystems through, for example, a bus or other connection between the hardware processing system and a storage system that provides the shopping list database 228 and the purchase history database 230. While illustrated as separate databases the shopping list database 228 and the purchase history database 230 may be the same database and/or may be linked using techniques known in the art. While the shopping list database 228 and the purchase history database 230 are illustrated as included in the customer device shopping list display system 200, in some embodiments, the shopping list database 228 and/or the purchase history database 230 may be coupled to the customer device shopping list display subsystems through, for example, a wireless connection provided by the one or more wireless communication subsystems 224 between the customer device shopping list display system 200 and another customer device, a merchant system, a payment service provider system, and/or a variety of other database systems.

In some embodiments, the shopping list information 228a and the budget information 228b stored in the shopping list database 228 may be provided by a user and may include a shopping list of products that the user wants to purchase from a merchant and a budget associated with the shopping list of products. For example, a user may enter each product into the shopping list of products on the customer device shopping list display system 200 in the order that the user determines that each product is required (e.g., there is no more milk or eggs left in the refrigerator), and a budget for purchasing the shopping list of products using the touch screen display 100c of the customer device shopping list display system 200. Furthermore, the user may add and/or remove products from the shopping list information and/or change the budget of the budget information stored in the shopping list database as desired. In one embodiment, budget information is not needed.

Figure 3:
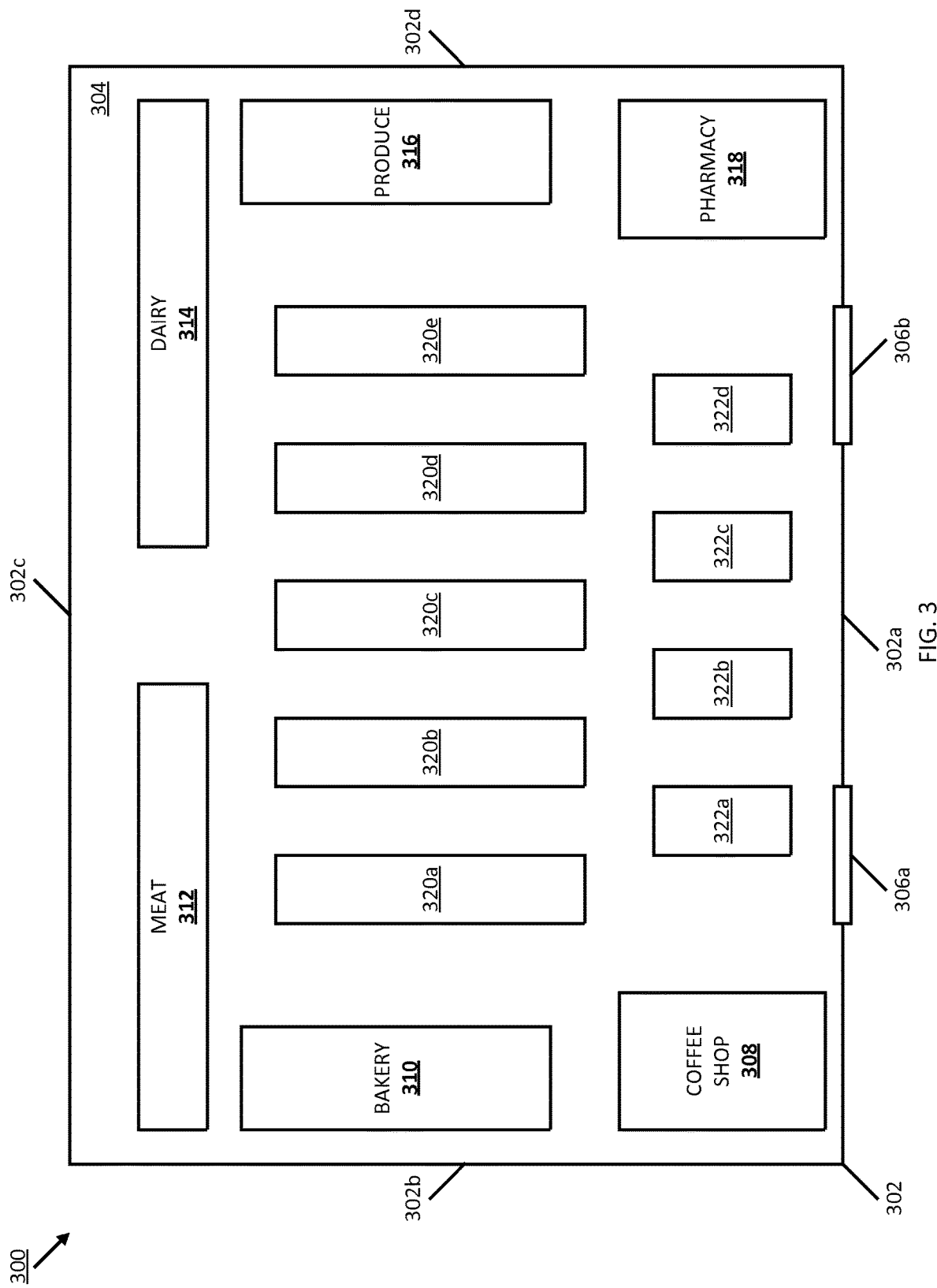
FIG. 3 is a schematic view illustrating an embodiment of a merchant physical location.

Referring now to FIG. 3, an embodiment of a merchant physical location 300 is illustrated. The merchant physical location 300 includes a merchant building 302 having a plurality of exterior walls 302a, 302b, 302c, and 302d that define a merchant physical location interior 304 that, in the embodiments illustrated and discussed below, is utilized as a grocery store. However, one of skill in the art in possession of the present disclosure will recognize that the customer device shopping list display system described herein may be utilized with virtually any merchant physical location such as, for example, an electronics store, a clothing store, a book store, a hardware store, and/or a variety of other merchant physical locations known in the art. The exterior wall 302a includes pair of exterior doors 306a and 306b (e.g., "front" doors in the illustrated embodiment).

In an embodiment, the merchant physical location interior 304 of the merchant physical location 300 includes a plurality of product sections. For example, as discussed above, in the embodiments discussed below the merchant physical location 300 is a grocery store and the merchant physical location interior 304 includes a Coffee section 308, a Bakery section 310, a Meat section 312, a Dairy section 314, a Produce section 316, and a Pharmacy section 318. While a few examples for a grocery store have been provided, one of skill in the art will recognize that any variety of different product sections in any merchant physical location will fall within the scope of the present disclosure. The merchant physical location interior 304 also includes a plurality of product shelves 320a, 320b, 320c, 320d, and 320e, each of which may hold products. The merchant physical location interior 304 also includes a plurality of check-out stands 322a, 322b, 322c, and 322d that may each include systems for allowing customers to purchase products located in the merchant physical location 300.

Figure 4:
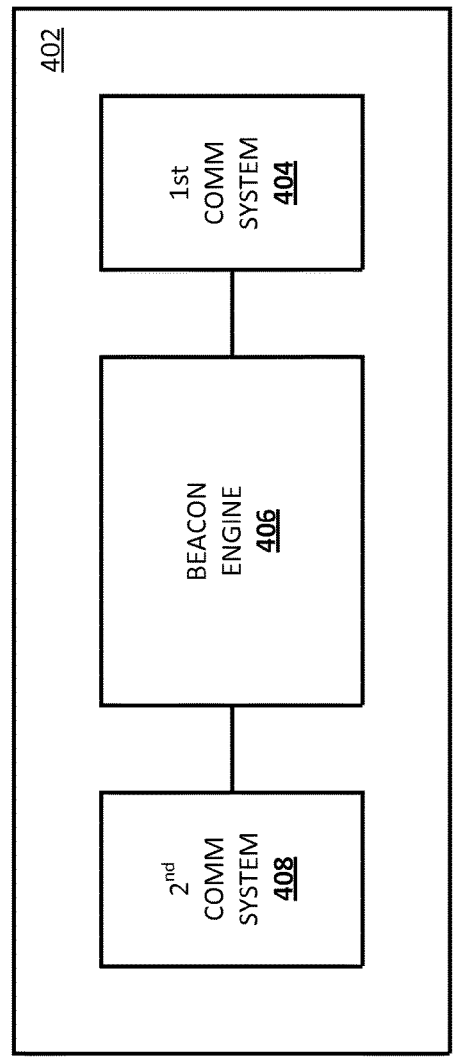
FIG. 4 is a schematic view illustrating an embodiment of a beacon device.

Referring now to FIG. 4, an embodiment of a beacon device 400 is illustrated. The beacon device 400 includes a chassis that houses a first communications system 404 such as, for example, a Wi-Fi communications system. The first communications system 404 is coupled to a beacon engine 406 that may be provided by instruction on a memory system (not illustrated) in the beacon device 400 that, when executed by a processing system (not illustrated) in the beacon device 400, cause the processing system to perform the functions of the beacon device 400 discussed below. The beacon engine 406 is coupled to a second communication system 208 such as, for example, a Bluetooth® Low Energy (BLE) communication system. The beacon engine 406 may be configured to receive any of a variety of sensor signals through the second communication system 408 and transmit those sensor signals using the first communication system 404. While a few examples of communications components in the beacon device 400 have been described, one of skill in the art will recognize that other communications devices, as well as other components that have been omitted for clarity of discussion and illustrated, may be included in the beacon device 400 and will fall within the scope of the present disclosure. One of skill in the art will recognize that the components described above allow for the beacon device to be provided in a relatively small form factor such that it may be placed inconspicuously almost anywhere. As such, the chassis 402 of the beacon device 400 may include any of a variety of features that allow for the coupling of the beacon device to any part of a merchant physical location, discussed below.

Figure 5A:
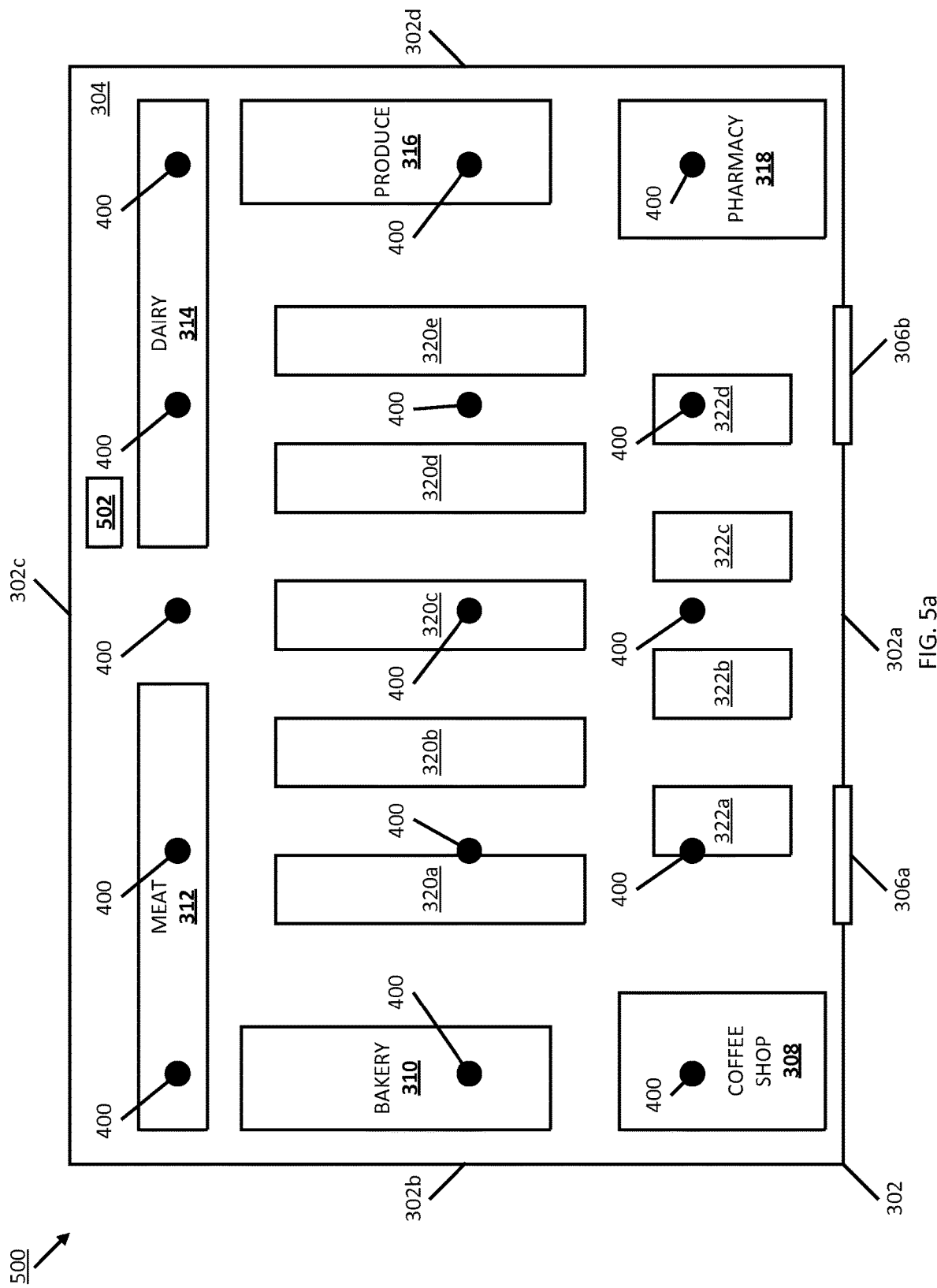
FIG. 5a is a schematic view illustrating an embodiment of a merchant shopping list support system that includes a plurality of the beacon devices of FIG. 4 in the merchant physical location of FIG. 3.
Figure 5B:
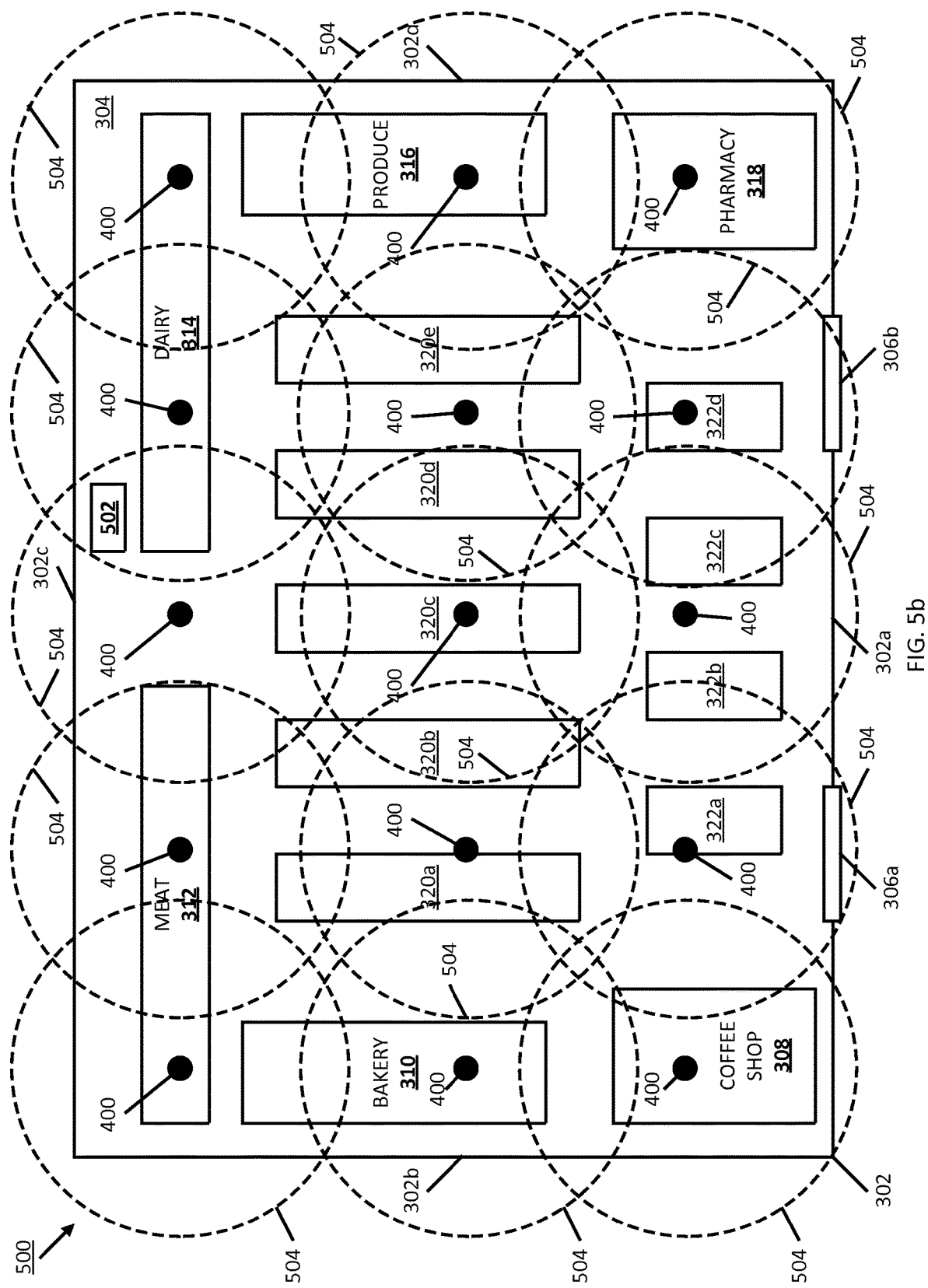
FIG. 5b is a schematic view illustrating an embodiment of the merchant shopping list support system of FIG. 5a with the beacon devices providing communication areas.

Referring now to FIGS. 5a and 5b, an embodiment of a merchant shopping list support system 500 is illustrated. As illustrated in FIG. 5a, the merchant shopping list support system 500 is provided by positioning a plurality of the beacon devices 400, discussed above with reference to FIG. 4, in and around the merchant physical location 300, discussed above with reference to FIG. 3. As discussed above, the beacon devices 400 may be sized such that they may be inconspicuously positioned virtually anywhere in or around the merchant physical location 300. For example, the beacon devices 400 may be positioned on the ceiling of the merchant physical location interior 304, on the product shelves 320a-e, on the check-out stands 322a-d, and/or in any other part of the merchant physical location 300. Each of the beacon devices 400 in the merchant shopping list support system 500 may be configured to wirelessly communicate, via its first communications system 404, with a merchant network communication device 502 such as, for example, a Wi-Fi wireless router connected to a network such as the Internet.

Referring now to FIG. 5b, in operation, each of the beacon devices 400 is configured to create a communication area 504 with its second communications system 204. For example, the second communications system 408 in each beacon device 400 may be a BLE communications device that provides an approximately 100 foot radius communications area. However, other communications systems providing other communications areas are envisioned as falling within the scope of the present disclosure. As can be seen in the illustrated embodiment, the beacon devices 400 may be positioned in and around the merchant physical location 300 such that the communications areas 504 abut, overlap, or otherwise provide coverage for any area of interest within and around the merchant physical location 300. As such, one of skill in the art in possession of the present disclosure will appreciate that different configurations of the beacon devices 400 within and around the merchant physical location 300 may be selected to cover any area within and around the merchant physical location 300 with a communications area 504. As discussed in further detail below, each of the beacon devices 400 are configured to communicate with customer devices 100 within their respective communications area 504 (e.g., using the second communication system 408) to allow information to be communicated between the beacon devices 400 and customer devices 100, which may also involve the beacon devices 400 to communicate (e.g., using the first communication system 404) the information between the beacon devices and a merchant device, a system provider device, and/or any other device operating to provide merchant shopping list support system discussed below.

In the embodiments illustrated and discussed below, the beacon devices 400 and their communications areas 504 are not illustrated for clarity, but it should be understood that the communications and retrieval of information from beacon communication devices, and the provision of that information to a system provider device, is accomplished using beacon devices providing communications areas such as the beacon devices 400 and communications areas 504 illustrated in FIGS. 5a and 5b. While a specific example of a merchant shopping list support system 500 is provided, one of skill in the art in possession of the present disclosure will recognize that a wide variety of different merchant physical locations may incorporate the beacon devices 400 in a variety of manners while remaining within its scope.

In an embodiment, the operation of the merchant shopping list support system 500 may include providing a map of the merchant physical location 300 and the relative locations of the products provided therein. For example, the dimensions, relative locations, and/or other characteristics of the Coffee section 308, Bakery section 310, Meat section 312, Dairy section 314, Produce section 316, Pharmacy section 318, product shelves 320a-d, check-out stands 322ad, product advertisements, marketing materials, and/or any other feature in the merchant physical location interior 304 may be provided to the customer device. As discussed below, the provision of such information to the customer device allows the customer device to create and utilize a detailed map, layout, or other reproduction of the merchant physical location interior 304. Furthermore, the positions/locations of products in the merchant physical location interior 304 may also be provided to the customer device. In one example, the positions/locations of products may be provided by the merchant or a system provider by selecting areas on a map of the merchant physical location 300. In another example, beacon communication devices may be attached to each product, and those beacon communication devices may be configured to report a product identification and a location for each product to the beacon devices 400 (e.g., using a communication systems such as the BLE communications system discussed above.) As discussed below, the provision of such information to the customer device allows the customer device to determine the current location of any product in the merchant physical location interior 304. While a few examples of the provision of merchant physical location layout information and product location information to the customer device have been described, one of skill in the art in possession of the present disclosure will recognize that a wide variety of merchant physical location information, product information, and information provisioning techniques will allow for the functionality of the customer device discussed below, and thus will fall within the scope of the present disclosure.

Furthermore, FIGS. 3, 5a, and 5b illustrate a merchant physical location 300 that is a single building, and the beacon devices 400 are positioned to provide communications areas 504 that cover the interior of that single building, and outside sections in the front of that single building. However, beacon devices 400 may be positioned virtually anywhere to retrieve information associated with a merchant physical location. For example, the merchant physical location may be located adjacent to or associated with a parking lot, and beacon devices may be positioned around that parking lot, at the entrances or exits of that parking lot, and/or anywhere else relative to that parking lot in order to communicate information between the beacon devices and the customer devices. In another example, the merchant physical location may be located in a mall, and beacon devices may be positioned around that mall, at the entrances or exits of that mall, and/or anywhere else relative to that mall in order to communicate information between the beacon devices and the customer devices. In some examples, the first communication system may be connected to Wi-Fi networks available outside the merchant physical location in order to communicate information between the beacon devices and a system provider device. In other examples, the first communication system may be a cellular communications system that allows the beacon devices to be positioned anywhere in range of a cellular communications tower, allowing beacon devices to be positioned in virtually any physical location when providing the merchant shopping list support system.

Figure 6:
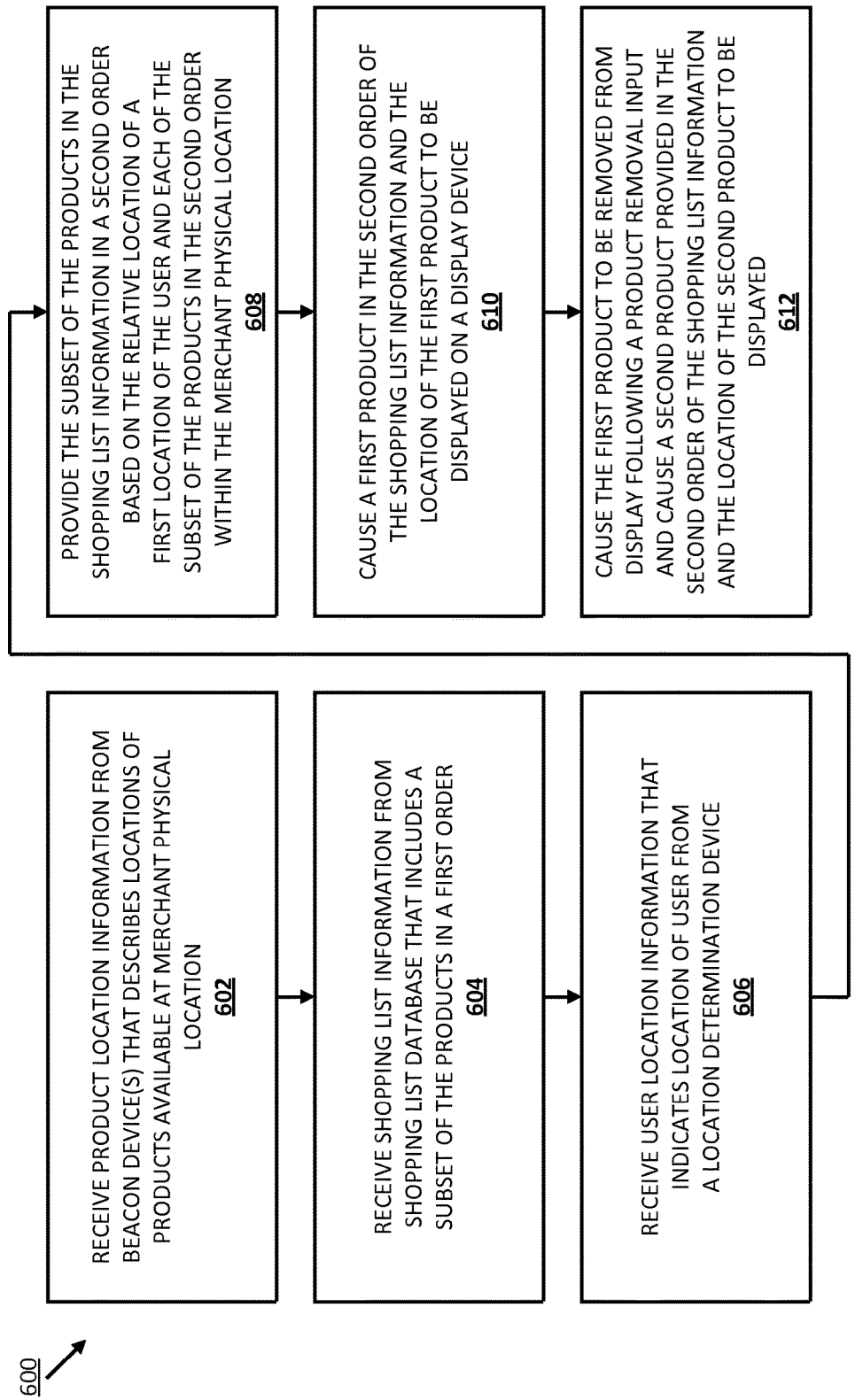
FIG. 6 is a flow chart illustrating an embodiment of a method for providing shopping list display to a customer.
Figure 7:
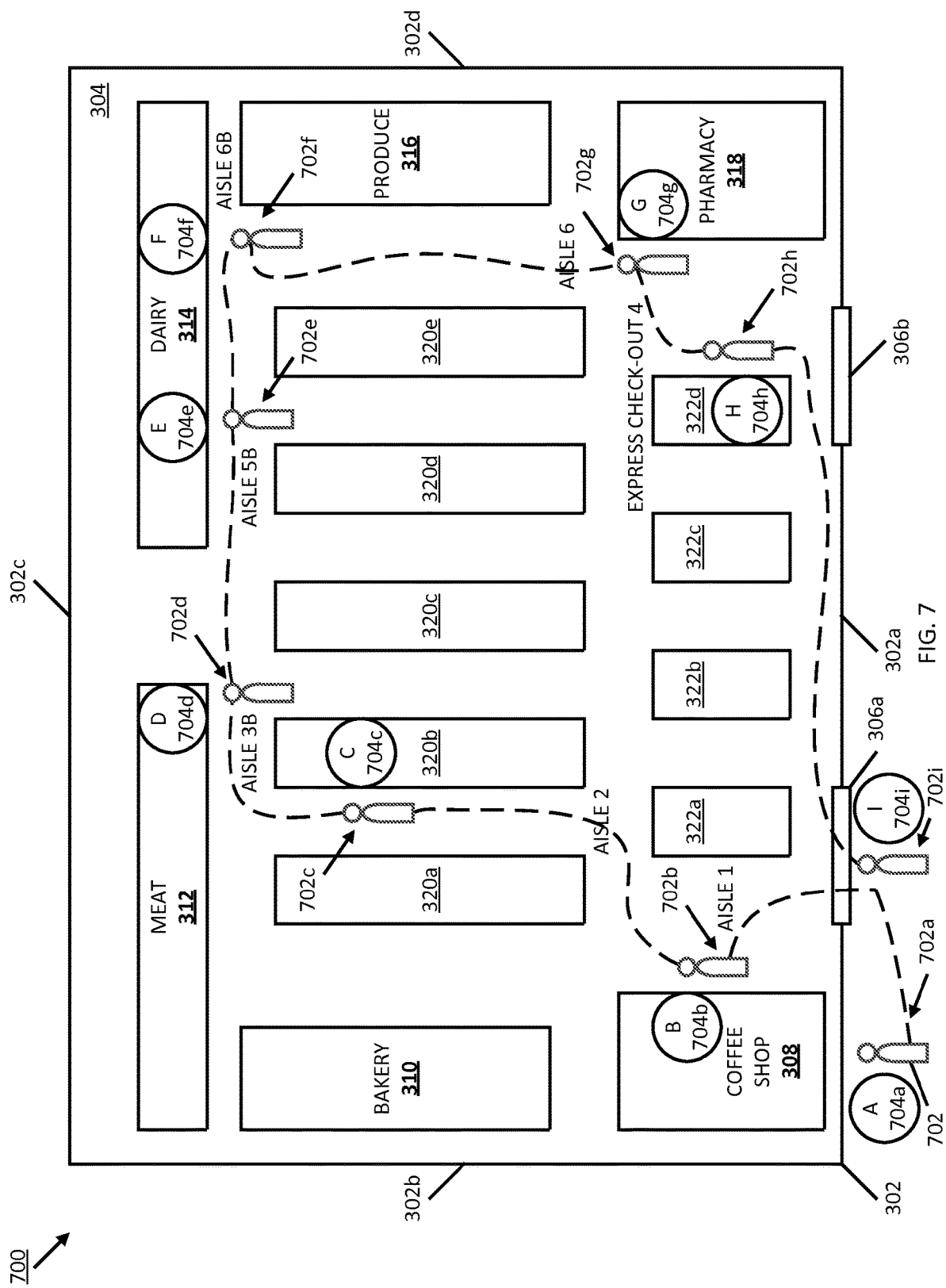
FIG. 7 is a schematic view illustrating an embodiment of a customer moving through the merchant physical location of FIG. 3.
Figure 8:
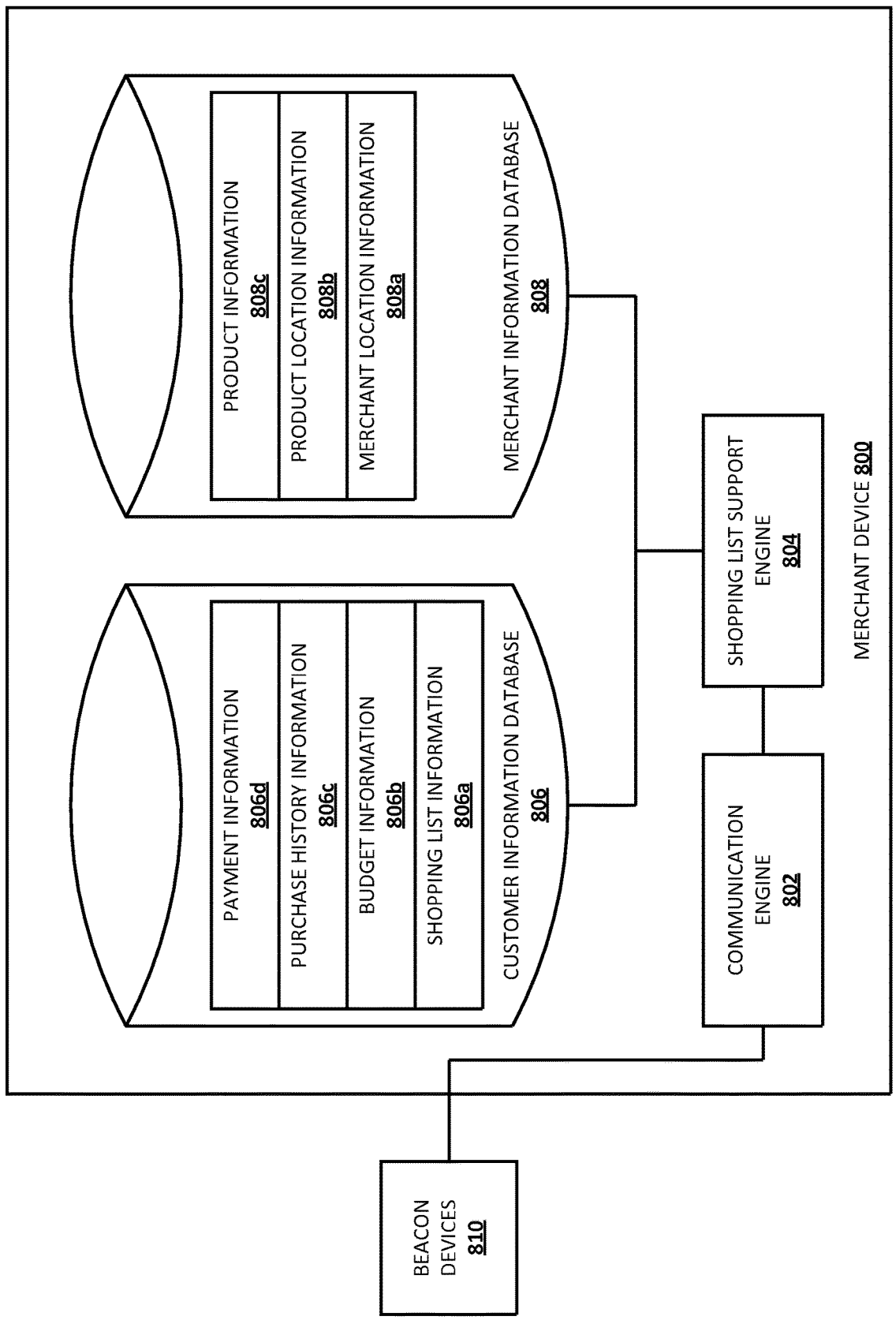
FIG. 8 is a schematic view illustrating an embodiment of a merchant device to provide shopping list support to a customer device shopping list display system.

Referring first to FIGS. 6, 7 and 8, an embodiment of a method for displaying a shopping list with a customer device is illustrated. The method 600 begins at block 602 where merchant location information is communicated during a customer shopping session from the beacon devices to the customer device. In an embodiment, a shopping session of a customer may include the detection of the beacon devices 400 at the merchant physical location 300 by the customer device 100 when that customer enters the merchant physical location 300, the customer device 100 receiving the location of products that are available at the merchant physical location 300 from the beacon devices 400, the customer device 100 receiving that customer's shopping list of products, the customer device 100 receiving the location of the customer when that customer first entered the merchant physical location 300, the customer device 100 determining the shortest route through the merchant physical location 300 to allow the customer to acquire the products in the shopping list, the customer device 100 displaying the first product in the shopping list and the location of the first product along the shortest route through the merchant physical location 300 to allow the customer to acquire the first product, the customer device 100 causing the first product to be removed from the display 100c following a product removal input on the customer device 100 and, in response, displaying the next product in the shopping list and the location of the next product along the shortest route through the merchant physical location 300 to allow the customer to acquire the next product, the customer device 100 determining that the customer has been allowed to acquire all of the products in the shopping list, and the customer device 100 detecting that customer leaving the merchant physical location 300.

For example, a shopping session for a customer may include the period that the beacon devices 400 are detectable by the customer device 100. In some embodiments, the shopping session may include a transaction conducted between that customer and the merchant at the merchant physical location 300. For example, a shopping session for a customer may end when that customer makes a purchase from the merchant. However, in other embodiments, a transaction may not be part of the shopping session (e.g., a "window shopping" session). Furthermore, in some embodiments, a shopping session may include multiple detections of the beacon devices 400 by the customer device 100 indicating that the customer has entered and exited the merchant physical location 300 multiple times without having been allowed to acquire all of the products in the shopping list. Further still, a shopping session may be extended/reduced by a customer adding/removing products in the shopping list. Thus, while a few examples are provided, a shopping session may include any number of customer visits to the merchant physical location 300 that are detected by the customer device 100 as deviations from the shortest route through the merchant physical location 300 and, in response, the customer device 100 determines another shortest route through the merchant physical location 300 to allow all of the products in the shopping list to be acquired and complete the shopping session.

Referring to FIG. 7, an embodiment of a customer moving through a merchant physical location 300 during a shopping session 700 is illustrated. Product location information of products available at the merchant physical location 300 at block 602 is also illustrated. In the embodiments discussed below, the term "customer" is applied to people that conclude a shopping session with a transaction with the merchant at a check-out stand 322d in the merchant physical location 300. However, "customer" may also apply to people that simply position themselves within range of a communication area 504 of a beacon device 400 in the merchant physical location 300 (e.g., potential customers, customer that are browsing products in the merchant physical location 300 without actually buying any products, etc.). FIG. 7 illustrates a customer 702 at a location 702a on an exterior walkway outside the merchant physical location 300 when the beacon communication subsystem 202 of the customer device shopping list display system 200 of the customer 702 initially detects at least one of the beacon devices 400 at the merchant physical location 300. At block 602, the merchant location information retrieval subsystem 204 of the customer device shopping list display system 200 of the customer 702 operates to receive merchant location information 808a that includes product location information 808b that describes locations of products available at the merchant physical location 300, discussed below with reference to FIG. 8, from the at least one of the beacon devices 400.

In an embodiment, the customer device shopping list display system 200 of the customer 702 may be a customer smart watch that is configured to communicate with the second communications systems 408 in the beacon devices 400 when the customer smart watch is located in the communications areas 504 of the beacon devices 400. For example, the customer smart watch may include a BLE communications system that is configured to communicate with the BLE communications systems in the beacon devices 400 when the customer smart watch is located in the communications areas 504 provided by those beacon devices 400. The BLE communications system in the customer smart watch may be configured to: access any data (e.g., stored in the customer smart watch, from sensors located in the customer smart watch, over a network that the customer smart watch is connected to, in databases accessible by the customer smart watch over the network, etc.) and provide that data to the beacon devices 400, and receive any data that is accessible by the beacon devices 400 (e.g., stored in the beacon devices 400, from sensors located in the beacon devices 400, transmission signals of the beacon devices 400, over a network that the beacon devices 400 are connected to, in databases accessible by the beacon devices 400 over the network, etc.) and provided by the beacon devices 400.

In another embodiment, the customer device shopping list display system 200 of the customer 702 may be a customer mobile phone that is configured to communicate with the second communications systems 408 in the beacon devices 400 when the customer mobile phone is located in the communications areas 504 of the beacon devices 400. For example, the customer mobile phone may include a BLE communications system that is configured to communicate with the BLE communications systems in the beacon devices 400 when the customer mobile phone is located in the communications areas 504 provided by those beacon devices 400. The customer mobile phone operates similarly to the customer smart watch described above.

In a specific embodiment, the merchant shopping list support system is provided by a payment service provider such as, for example, PayPal, Inc. of San Jose, Calif., that provides merchant services to allow the merchant to provide shopping list support services to customers, and payment services that allow customers and merchants to perform transactions with each other. In such embodiments, the merchants and customers may include accounts with the payment service provider such that the merchant includes a merchant account with the payment service provider, and a customer includes a customer account with the payment service provider. Thus, at block 602, the customer 702 may include the customer account that includes payment information 230b with a payment service provider that provides the merchant shopping list support system. In some embodiments, the customer smart watch of the customer 702 may include a payment service application that is linked to the payment information 230b of the customer account and that provides for automatic communication between the customer smart watch and beacon devices 400 when the customer smart watch is located in a communications area 504 provided by the beacon device 400 (e.g., the customer 700 may have previously provided permission for the exchange of data between their customer smart watch and the beacon devices 400). In other embodiments, the customer smart watch or payment service application may ask the customer for permission to communicate with the beacon devices 400 upon detecting a communication area 504.

Thus, at block 602, the customer 702 includes a customer device that is communicating with the beacon devices 400 when that customer is located in any of the communications areas 504. At block 602, the beacon devices 400 may operate to receive the product location information 808b (e.g., via operation of its beacon engine 406 and use of its first communication system 404) over the network from the system provider device and provide the product location 808b (e.g., via its second communication system 408) to the customer device of the customer 702. In an embodiment, the customer device may be a customer smart watch that communicates location information retrieved from a location determination device (e.g., Global Positioning System (GPS) device) in the customer smart watch to the beacon devices 400 to allow the merchant device 800, a system provider device 1100, and/or a payment service provider device 1200 discussed below with references to FIGS. 8, 11, and 12, respectively, to provide the merchant shopping list support system and functionality of the customer device. In another embodiment, the beacon devices 200 may be configured to determine a location of the customer device using, for example, triangulation or other location determination techniques known in the art. As such, as the customer 702 moves through the communication areas 304 provided by the beacon devices 400, customer location information associated with that customer (e.g., retrieved or otherwise determined by the beacon devices 400 from that customers smart watch) is collected by the beacon devices 400 (e.g., via its second communication system 408) and sent by the beacon devices 400 (e.g., via operation of its beacon engine 406 and use of its first communication system 404) over the network to the merchant device 800, the system provider device 1100, and/or the payment service provider device 1200, to provide the merchant shopping list support system and functionality of the customer device.

FIG. 7 illustrates the customer device shopping list display system 200 of the customer 702 initially detecting at least one beacon device 400 at a location 702a on an exterior walkway 704a outside of the merchant physical location 300. The route the customer 702 follows throughout the merchant physical location 300 to acquire all of the products on the customers shopping list is indicated in FIG. 7 by dashed lines between different areas in the merchant physical location 300 where the customer device shopping list display system 200 of the customer 702 communicates with at least one beacon device 400 during a shopping session. The locations of each of the various products on the customer's shopping list are indicated in FIG. 7 by an alphabetic letter (e.g., B) enclosed in a circle at the different areas in the merchant physical location 300. The locations of various non-product items (e.g., walkways, doors, cash registers, etc.) are similarly indicated by letters enclosed in circles.

In the illustrated example, in response to the customer device shopping list display system 200 of the customer 702 initially detecting the at least one beacon device 400 of the merchant physical location 300, the customer device shopping list display system 200 re-orders the customer's shopping list and determines the shortest route through the merchant physical location 300 for the customer 702 to fulfill the customer's re-ordered shopping list based at least in part on the relative location of the initial location of the customer 702a at the location of the exterior walkway 704a, and the locations of the products in the re-ordered shopping list within the merchant physical location 300.

The customer device shopping list display system 200 causes the first product and the location of the first product to be displayed which allows the customer to find the first product (e.g., Coffee, located at the Coffee Shop on Aisle 1, turn left from entrance). The customer 702 then, following the shortest route determined above, moves from the exterior walkway at location 704a ("A") through the exterior door 306a and to an area 702b in the merchant physical location interior 304 labeled Aisle 1 that is located adjacent to or within the coffee section 308 where the location of the initial product 704b ("B") of the customer's re-ordered shopping list (e.g., Coffee) may be acquired by the customer. Then, in response to a product removal input, the next closest product is displayed on the customer device shopping list display system 200, the customer 702 proceeds along the shortest route to an area 702c in the merchant physical location interior 304 labeled Aisle 2 that is located between the product shelves 320a and 320b at the location of the next product (e.g., Cereal) 704c ("C"), then to an area 702d in the merchant physical location interior 304 labeled Aisle 3B that is located adjacent to or within the meat section 312 at the location of the next product (e.g., Hamburger) 704d ("D"), and then to an area 702e in the merchant physical location interior 304 labeled Aisle 5B that is located adjacent to or within the dairy section 314 at the location of the next product (e.g., Milk) 704e ("E"). [Just trying to break up the paragraphs a bit; some seem overly long.]

Next, the customer 702 may move to an area 702f in the merchant physical location interior 304 labeled Aisle 6B that is located adjacent to or within the dairy section 314 at the location of the next product (e.g., Eggs) 704f ("F"), then to an area 702g in the merchant physical location interior 304 labeled Aisle 6 that is located adjacent to or within the pharmacy section 318 at the location of the next product (e.g., Prescription) 704g ("G"), then to an area 702h in the merchant physical location interior 304 labeled Express Check-Out 4 that is located adjacent to or within the check-out stand 322d at the location of 704h ("H") to purchase the products of the re-ordered shopping list 914. In an embodiment, the customer device shopping list display system 200 discussed above may also be utilized to perform a transaction between the customer 702 and the merchant at the merchant physical location 300 to purchase the products previously described. As discussed above, each beacon device 400 provides a communication area 504 that may, for example, include a 100 foot diameter. However, any of the beacon devices 400 may be throttled, modified, or otherwise adjusted to reduce the size of their associated communication area 504 (e.g., by adjusting the power provided to the beacon device 400, adjusting the operation of a communication system, etc.). For example, the operation of the second communication system 408 in a beacon device 400 may be adjusted to reduce the diameter of the communication area 504 from a 100 foot radius to an approximately 2-3 foot radius such that only a single customer device may communicate with that beacon device 400 while performing the transaction.

After completing the transaction, the customer 702 moves from the check-out stand 322d at the location of 704h ("H") through the exterior door 306a and to an area 702i at the exterior walkway at location 704i ("I") using the customer device shopping list display system 200 of the customer 702 to display the locations of areas in the merchant physical location 300 and/or the locations of previous locations of the customer 702, such as, finding and returning to the customer's 702 car parked in the merchant physical location 300 in the shortest route through the exterior and interior of the merchant physical location 300 to complete the shopping session including arriving and leaving the merchant physical location 300.

While a few examples have been illustrated and described, one of skill in the art will recognize how customer location information of a customer, merchant location information of a merchant and product location information of the merchant may be retrieved by a customer device shopping list display system 200 of a customer 702 using beacon devices 400 positioned anywhere in or around the merchant physical location 300 and used to allow that customer to fulfill their shopping list in an efficient manner following the shortest route through the merchant physical location 300. As such, customers may park in, enter, move about, exit, and exit a parking lot of a merchant physical location 300 using the shortest route displayed on a customer device shopping list system 200 that allows the customer to find the closest entrance, next product, check-out stand, exit, the car, the parking lot exit in an efficient manner and effectively using a customer device with a small display. Thus, while a specific route of the customer 702 shopping session is illustrated and used below in providing customer shopping list display help, one of skill in the art in possession of the present disclosure will recognize that customer location information, merchant location information and product location information may describe any route throughout the merchant physical location 300 and may be used to provide the customer shopping list display help described below.

Referring now to FIGS. 6 and 2, the method 600 then proceeds to block 604 where the shopping list retrieval subsystem 206 of the customer device shopping list display system 200 of the customer 702 may operate to retrieve shopping list information 228a that includes a subset of the products in a first order that are available at the merchant physical location 300 from the shopping list database 228.

In an embodiment, at block 604, a shopping list creation subsystem 220 of the customer device shopping list display system 200 of the customer 702 may operate to retrieve a purchase history included in the purchase history information 230a from the purchase history database 230, and use the purchase history to automatically generate the shopping list information 228a that includes a subset of the products in a first order based on the purchase history. For example, the shopping list creation subsystem 220 may determine that the customer purchases a subset of products every week from the purchase history and automatically include that subset of products in the shopping list information 228. The shopping list creation subsystem 220 may also determine another subset of products that the customer last purchased that have reached or exceeded their expiration date and automatically include that other subset of products in the shopping list information 228. The method 600 then proceeds to block 606. At block 606, the user location determination subsystem 208 of the customer device shopping list display system 200 of the customer 702 may operate to receive user (customer) location information that indicates a location of the user (the customer) from a location determination device 210 when that customer first entered the merchant physical location 300. In an embodiment, the customer device may be a customer smart watch that communicates location information retrieved from a location determination device (e.g., Global Positioning System (GPS) device) in the customer smart watch. In another embodiment, the location determination device 210 may be configured to determine a location of the customer device by using, for example, the location of the beacon devices from the merchant location information 808b of the beacon devices 400 and triangulation or other location determination techniques known in the art between the beacon devices 400 and the customer device. The method 600 then proceeds to block 608.

At block 608, the product reordering subsystem 212 of the customer device shopping list display system 200 of the customer 702 may operate to use the shopping list information 228a, the user location information, and the product location information 808b received by the merchant location information retrieval subsystem 204 to provide the subset of the products included in the shopping list information 228a in a second order that is different than the first order based at least in part on the relative location of the location of the user (the customer) received from the location determination device 210 and each of the subset of products in the second order of the shopping list information 228a within the merchant physical location 300.

In an embodiment, the product reordering subsystem 212 of the customer device shopping list display system 200 of the customer 702 may further operate to provide the subset of the products included in the shopping list information 228a in the second order that is different than the first order based at least in part on budget information 228b of the shopping list information 228a. For example, the subset of the products included in the shopping list information 228a in the first order may include a priority associated with each of the products (e.g., a must have product, a nice to have product, a wish list product, etc.) that the product reordering subsystem 212 uses to determine the subset of the products included in the shopping list information 228a that fit within the budget of the budget information 228b based on a price included in the product information 808c of merchant location information 808a for each of the subset of products included in the shopping list information 228a, and only providing the subset of products that fit within the budget included in the shopping list information 228a in the second order. In another embodiment, the product reordering subsystem may further operate to prompt the customer 702 to override the budget and accept/decline each product that did not fit within the budget of budget information 228b.

In an embodiment, as part of, in parallel to, or subsequent to the operation of the product reordering subsystem 211, the user route determination subsystem 212 may operate to use the subset of the products in the second order of the shopping list information 228a, the user location information from the location determination device 210, and the product location information 808b to determine the shortest user route through the merchant physical location 300 for the customer to acquire the subset of the products in the second order of the shopping list information 228a, that may result in completing the shopping session in an efficient manner. For example, the product reordering subsystem 212 may utilize one or more route planning algorithms known in the art, such as real-time vehicle route planning algorithms to find optimal routes from a starting point to multiple destinations on a road map (e.g., a Dijkstra shortest path algorithm, a Genetic and hybrid Genetic algorithms to solve routing search and optimization problems, an A* algorithm shortest path algorithm, a Tabu search routing planning algorithm, and an ANT based colony algorithm to find a solve the routing search and optimization problem), where the vehicle is the customer, the starting point may be the initial location of the customer 702 at location 704a, as discussed above, the road map may be a map of the merchant physical location 300 derived from the merchant location information 808a, the destinations may be the locations of the subset of the products in the second order of the shopping list information 228a in the merchant physical location 300, and the ending destination may be the location of the entrance 306a at location 304i that the customer uses to exit the merchant location 300 or the location of one of the check-out stands 322a, 322b, 322c, or 322d, such as, the location 704h of the check-out stand 322d as illustrated in FIG. 7.

In another embodiment, the user route determination subsystem 212 may further operate to dynamically detect in real-time when the customer 702 deviates from the first user route during the shopping session and, in response, using the subset of the products in the second order of the shopping list information 228a, the current location of the customer 702 of user location information from the location determination device 210, and the product location information to determine a second user route that is different than the first user route and that is the shortest user route through the merchant physical location to acquire the subset of the products in the second order of the shopping list information subsequent to the deviation, where the second user route may be determined as previously described. The method 608 then proceeds to block 610.

At block 610, the product display subsystem 214 of the customer device shopping list display system 200 of the customer 702 may operate to cause a first product provided in the second order of the shopping list information 228a and the location of the first product in the merchant physical location 300 to be displayed on the display device 216 of the customer device shopping list display system 200 of the customer 702. Displaying only a subset of the products and product locations provided in the second order of the shopping list information 228a on the display device 216 may allow the customer device shopping list display system 200 to provide efficient shopping session information on a customer device with a small display screen, such as, a smart watch device, and other wearable devices.

Referring now to FIG. 8, an embodiment of a merchant device 800 is illustrated. In an embodiment, the merchant device 800 may provide shopping list support to the customer device shopping list display system 200 and functionality of the customer device shopping list display system 200 to the customer device, as described in detail above. In an embodiment, the merchant device 800 includes a communication engine 802 that is communicatively coupled to beacon devices 810, and a shopping list support engine 804 that is communicatively coupled to the communication engine 802, a customer information database 806, and a merchant information database 808, where storage (not illustrated) of the merchant device 800 may store the customer information database 806 and the merchant information database 808. While illustrated as separate databases, the customer information database 806, and the merchant information database 808 may be the same database and/or may be linked using techniques known in the art.

In an embodiment, the customer information database 806 may store shopping list information 806a, budget information 806b, purchase history information 806c, payment information 806d, and/or a variety of other customer information known in the art, any of which may be linked with any other customer information in the customer information database 806. For example, customer account information may identify the customer 702, and may be linked to customer purchase history information of the customer 702 that includes transactions between the customer and the merchant at the physical merchant location 300. The shopping list information 806a, the budget information 806b, the purchase history information 806c, the payment information 806d, and/or the variety of other customer information may be retrieved from the customer device shopping list display system 200, created by the merchant device, received from a system provider device 1100, and/or received from a payment service provider device 1200.

In an embodiment, the merchant information database 808 may store merchant location information 808a that describes the layout of the merchant physical location 300, the location of various items within the merchant physical location 300 (e.g., check-out stands, entrances, parking lots, etc.), product location information 808b that describes the locations of the products that are available at the merchant physical location 300, product information 808c that includes comparable products, prices, discounts, sale prices, rebates, product identifications, and/or a variety of other product information known in the art.

Referring now to FIGS. 7, and 9a, a customer device 900 is illustrated that is associated with the customer 702 and that includes a customer device display 902 and a shopping list database (not illustrated) similar to the shopping list database 228 previously described that stores a subset of products available at the merchant location 300 of shopping list information in a first order (a customer shopping list 910), a subset of recommended products available at the merchant location 300 (a recommendations list 912), and a subset of products available at the merchant location 300 of the shopping list information in a second order (a re-ordered customer shopping list 914) that includes the customer shopping list 910 and the recommendations list 912. The customer device 900 may be the customer device shopping list display system 200 previously described with reference to FIG. 2. The customer device display 902 is displaying a customer device display image 902a using a first product provided in the subset of products available at the merchant location 300 of the shopping list information in the second order and the location of the first product in the merchant physical location 300 to be displayed at block 610. The customer device display image 902a includes a product that shows the next product 904a to be acquired during a shopping session, a location of the product 906a in the merchant physical location 300, and directions 908a to the next product 904a from the current location of the customer 702.

In one example of the illustrated embodiment, at block 602 of the method 600, the merchant location information retrieval subsystem 204 of the customer device 900 used the product information 808b to determine that the dress shoes in the customer shopping list 910 are not available at the merchant physical location 300 as indicated by the entry of "X) Dress Shoes, Merchant #2→Product Not Sold by Merchant #1" in the re-ordered customer shopping list 914. Then, at block 604 of the method 600, the shopping list retrieval subsystem 206 of the customer device 900 used the budget information 228b and the product information 808c to determine that the prescription in the customer shopping list 910 does not fit within the budget as indicated by the entry "G) Prescription, Aisle 6, Location F→Exceeds Budget $50.00 by $5.00" in the re-ordered customer shopping list 914. The shopping list retrieval subsystem 206 also used the purchase history information 230a to determine that the milk that was last purchased had exceeded its expiration date and caused the milk to be added to the recommendations list 912 and then the re-ordered customer shopping list 914 as indicated by the entry "1) Milk, Last Purchase Exceeds Expiration" in the recommendations list 912 and the entry "E) Milk, Aisle 5B, Location E" in the re-ordered customer shopping list 914.

At block 608 of the method 600, the product reordering subsystem 212 of the customer device 900 used the customer shopping list 910 and the recommendations list 912 in the first order as indicated by the product entries "1) through 6)" and "1)" listed in increasing numerical order in the customer shopping list 910 and the recommendations list 912, respectively, and the product location information 808b to provide the re-ordered customer shopping list 914 in the second order as indicated by the product entries "B) through G)" listed in alphabetical order in the re-ordered customer shopping list 914. Also, at block 608 of the method 600, the user route determination system of the customer device 900 used the re-ordered customer shopping list 914, the location of the customer 702 at the start of the shopping session 702a, the product location information 808b, and the merchant location information 808a to determine the shortest customer route through the merchant physical location 300 to acquire the products in the re-ordered customer shopping list 914 as indicated by the entries "A) through I)" in the re-ordered customer shopping list 914. Then, at block 610, the product display subsystem 214 used the shortest customer route, the first product provided in the re-ordered customer shopping list 914, and the location of the first product in the merchant physical location 300 previously determined to cause the first product 904a, the location of the first product 906a, and the directions to the first product 908a to be displayed on the customer device display 902 such that the customer device display image 902a is displayed.

As can be seen in the embodiment illustrated in FIG. 9a, the customer device display image 902a informs the customer 702 that, based on the initial customer location information at location 702a at the start of their shopping session, the next item in the customer shopping list is "Coffee" 904a. In addition, the customer device display image 902a informs the customer 702 that the product location of the next item in the merchant physical location is the "Coffee Shop, Aisle 1" 906a to indicate where the next item is located, and provides directions from the current location 702a of the customer 702 to the location of the next item in the shopping list 704b as illustrated as "Turn Left from Entrance 1", which allows the customer 702 to determine how to find the next item in the merchant physical location 300.

In another embodiment illustrated in FIG. 9b, the customer device display 902 is displaying a customer device display image 902b and the customer device operates as previously described with reference to FIG. 9a. Similar to the customer device display image 902a, the customer device display image 902b includes the product that shows the next product 904b to be acquired during the shopping session and the location of the product in the merchant physical location 906b as described above. However, instead of including directions to the next product, the customer device display image 902b includes a map 908b that shows a partial route to the next product from the current location 702a of the customer 702.

In an example of the illustrated embodiment, at block 610 of the method 600, the product display subsystem 214 used the shortest customer route, the first product provided in the re-ordered customer shopping list 914, and the location of the first product in the merchant physical location 300 previously determined to cause the first product 904b, the location of the first product 906b, and the map 908b to the first product to be displayed on the customer device display 902 such that the customer device display image 902b is displayed.

Figure 9B:
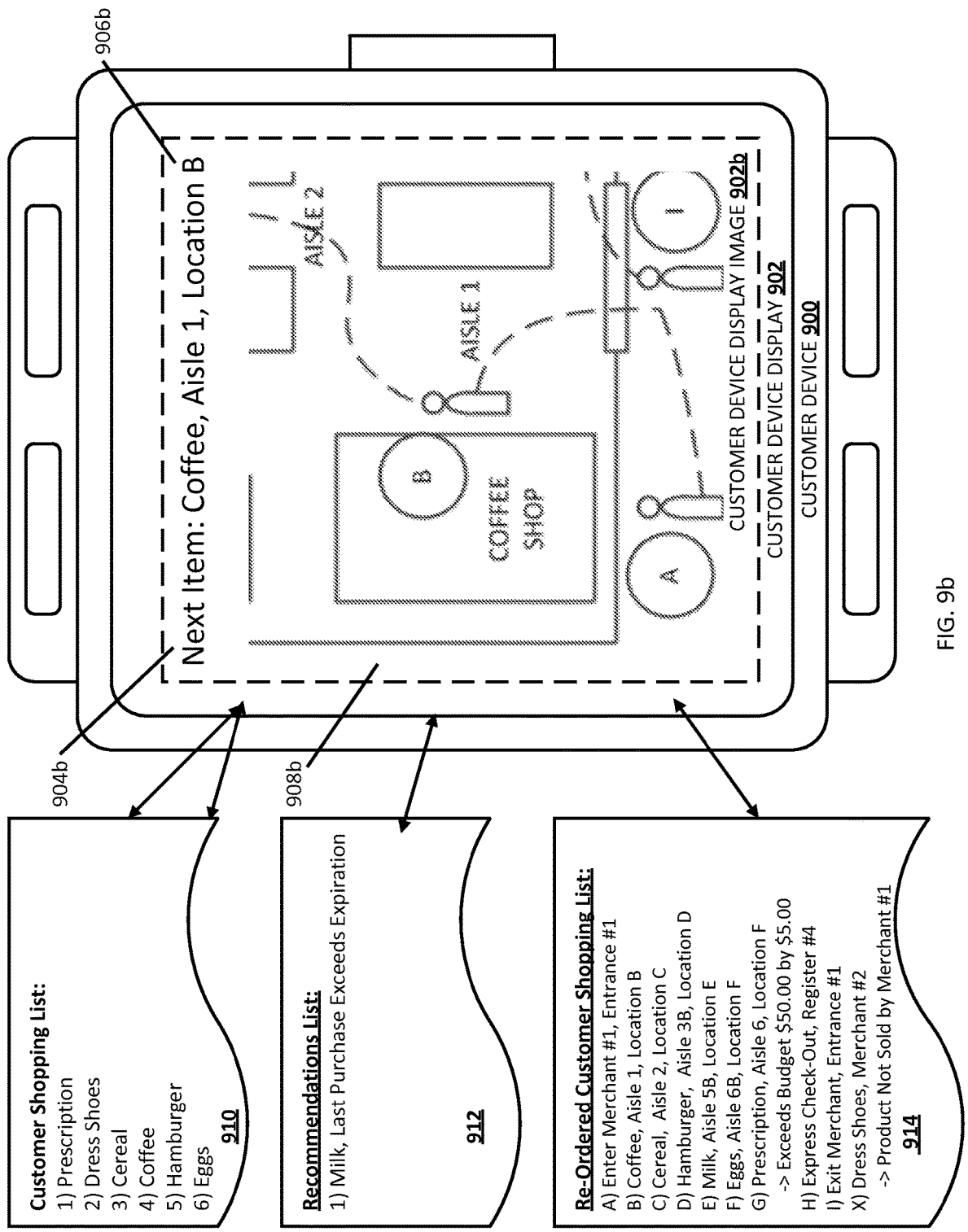
FIG. 9b is a front view illustrating an embodiment of a customer device displaying an image of a product and a partial map to the product.

As can be seen in the embodiment illustrated in FIG. 9b, the customer device display image 902b informs the customer 702 of the partial route to follow in order to get from the customer's current location 702a to the location of the next product 704b in the merchant physical location 300, shown as the dashed line between indicator "A" and indicator "B" of the partial map 908b of the merchant physical location 300 as illustrated in FIG. 7, which allows the customer 702 to follow the map 908b to find the next item 904b in the merchant physical location 300.

In another embodiment, the product display subsystem 214 of the customer device shopping list display system 200 of the customer 702 may further operate to cause at least one second product in the second order of the shopping list information and the location of the at least one second product in the merchant physical location to be displayed on the display device along with the first product.

The method 600 then proceeds to block 612, where the product display subsystem 214 of the customer device shopping list display system 200 of the customer 702 may further operate to cause the first product to be removed from display on the display device 216 following a product removal input and, in response, cause a second product provided in the second order of the shopping list information and the location of the second product in the merchant physical location 300 to be displayed on the on the display device 216 of the customer device shopping list display system 200 of the customer 702.

Figure 9C:
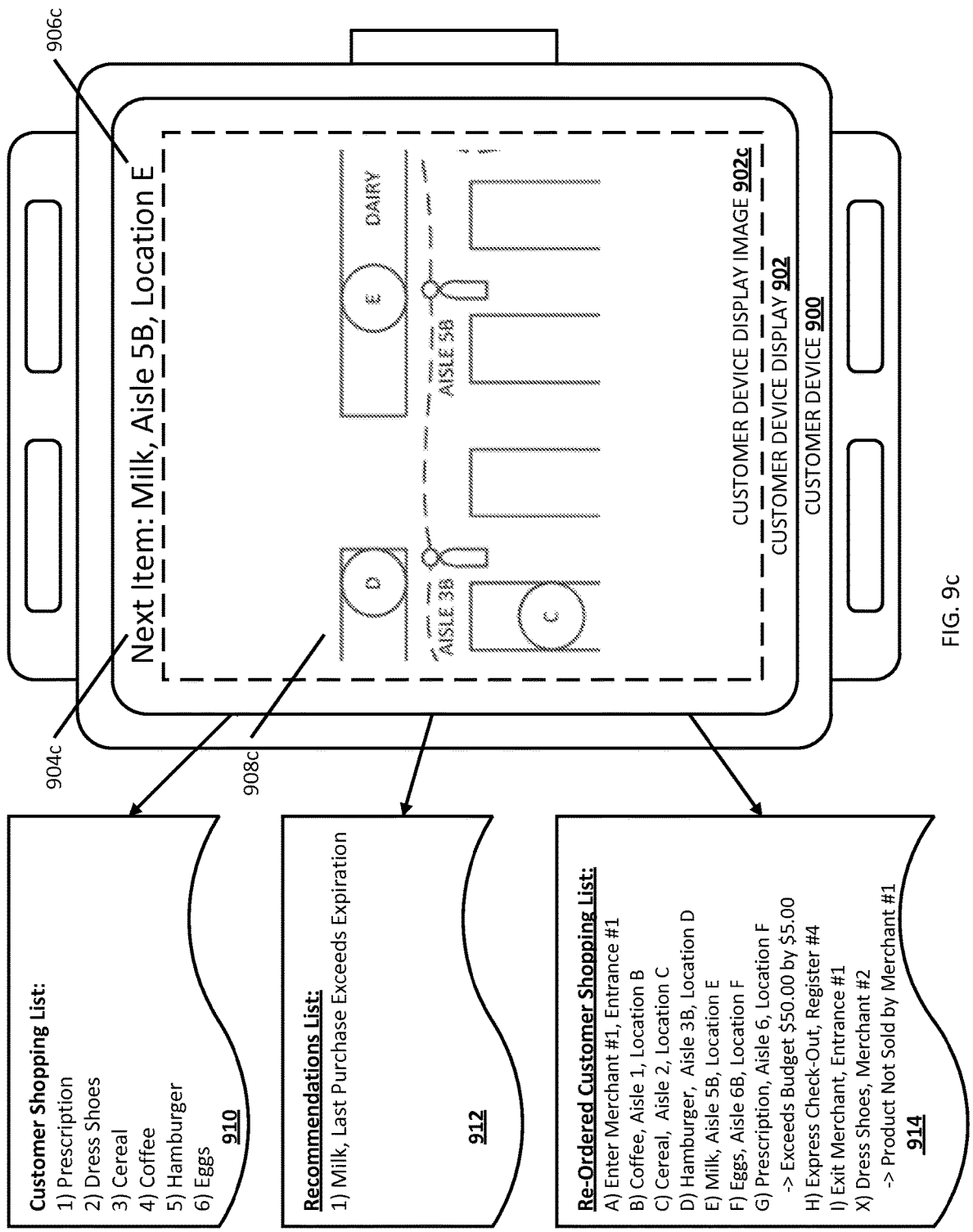
FIG. 9c is a front view illustrating an embodiment of a customer device displaying an image of a recommendation of a product and a partial map to the product.

Referring now to FIGS. 7, and 9c, the customer device display 902 is displaying a customer device display image 902c and the customer device 900 operation is similar to the customer device 900 operation previously described with reference to FIGS. 9a and 9b. Similar to the customer device display images 902a and 902b, the customer device display image 902c includes the product that shows the next product 904b to be acquired during the shopping session and the location of the product 906b in the merchant physical location 300 as described above. Also, similar to the customer device display image 902b, the customer device display image 902c includes a map 908c that shows a partial route to the next product 904c from the current location 702d of the customer 702.

In an example of the illustrated embodiment, at block 612 of the method 600, the product display subsystem 214 used the product removal input on the customer device 900 of the customer 700 to cause the first product to be removed from display on the customer device display 902. The product display subsystem 214 then, in response to the product removal input, used the re-ordered customer shopping list 914 and the location of the second product 704e in the merchant physical location 300 previously determined to cause the second product 904c, the location of the second product 906c, and the map 908c to the second product 904c to be displayed on the customer device display 902 such that the customer device display image 902c is displayed.

As can be seen in the embodiment illustrated in FIG. 9c, the customer device display image 902c informs the customer 702 of the partial route to follow in order to get from the customer's current location 702d to the location of the next product 704e in the merchant physical location 300, shown as the dashed line between indicator "D" and indicator "E" of the partial map 908c of the merchant physical location 300 as illustrated in FIG. 7, which allows the customer 702 to follow the map 908c to find the next product 904c in the merchant physical location 300.

In another embodiment of the method 600, a comparable product subsystem 222 may operate to receive comparable product information from the beacon devices 400 at the merchant physical location 300, determine a first comparable product for at least one product in the subset of products included in the shopping list information 228a, and cause, by the product display subsystem, the first comparable product to be displayed on the display device 216. For example, as the customer 702 enters the merchant physical location 300, the comparable product subsystem 222 provides the shopping list information 228a to the merchant device 800 through the beacon devices 400, the merchant device 800 determines at least one product in the subset of products included in the shopping list information 228a in the first order, and provides the at least one comparable product to the comparable product subsystem 222 through the beacon devices 400 which causes the at least one comparable product to be displayed on display device 216.

Further, the product display subsystem 214 may prompt the customer to cause the shopping list information 228a in the first order to be altered by changing the at least one product in the subset of products included in the shopping list information 228a in the first order to the at least one comparable product. As another example, the at least one comparable product may be provided at any time during the shopping session of the customer 702 and may, in response, cause the product reordering system 212 and/or the user route determination subsystem 218 to provide the subset of the products included in the shopping list information 228a in a third order that is different than the second order based at least in part on the inclusion of the at least one comparable product in the in the shopping list information 228a in the second order and cause the user route determination subsystem to determine a second user route that is different than the first user route and that is the shortest user route through the merchant physical location 300 to acquire the subset of the products in the third order of the shopping list information based at least in part on the inclusion of the at least one comparable product in the in the shopping list information 228a in the second order, where the second user route may be determined as previously described.

Figure 10:
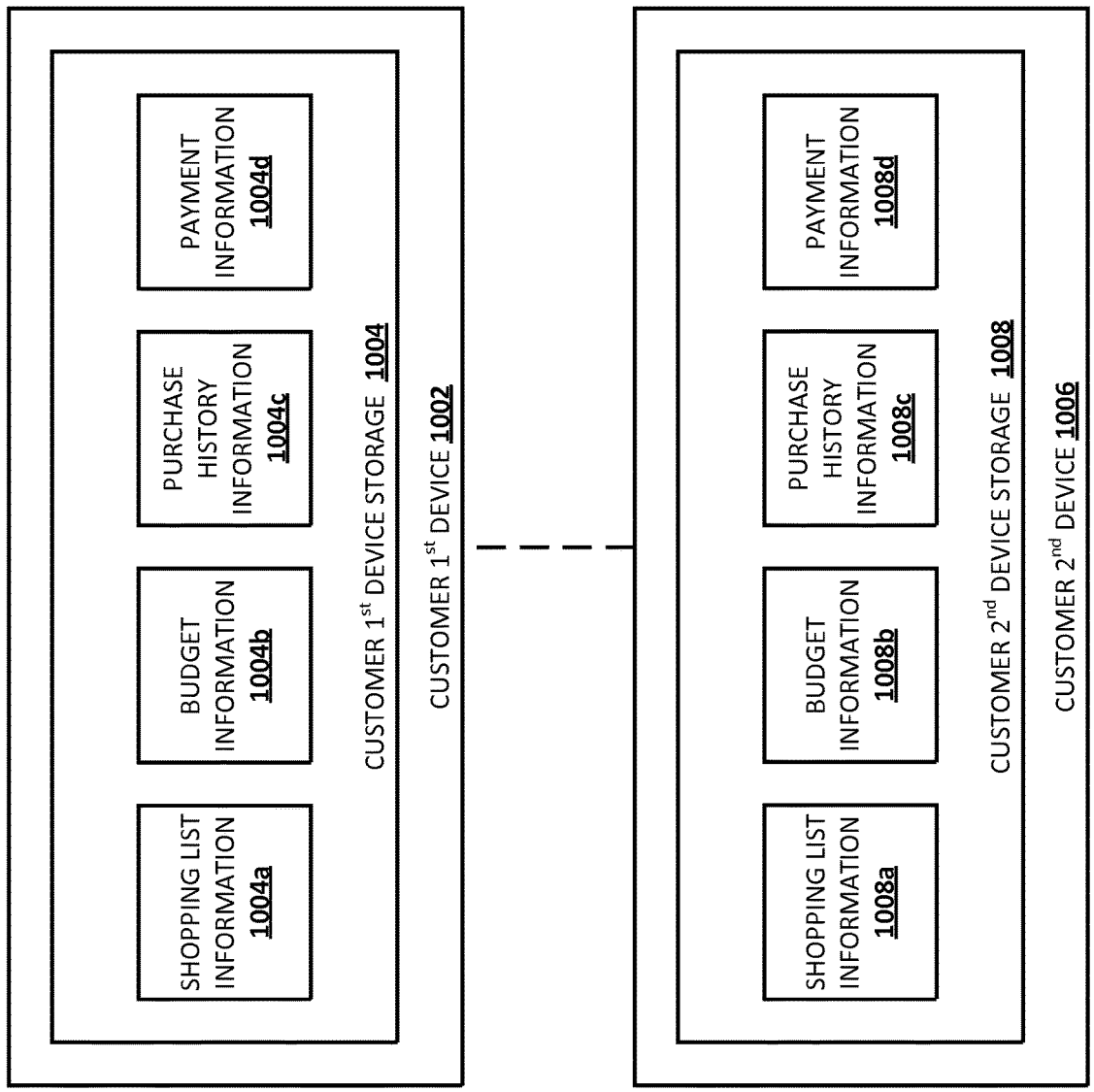
FIG. 10 is a schematic view illustrating an embodiment of a plurality of linked customer devices.

Referring now to FIG. 10, a customer device linking system 1000 is illustrated that includes a customer first device 1002 communicatively coupled to a customer second device 1006 that are communicating with each other and that are linked to each other (illustrated by the dashed line). The customer first device 1002 includes customer first device storage 1004 storing shopping list information 1004a, budget information 1004b, purchase history information 1004c, and payment information 1004d. The customer second device 1006 includes customer second device storage 1008 storing shopping list information 1008a, budget information 1008b, purchase history information 1008c, and payment information 1008d. The customer first device 1002 and the customer second device storage 1008 may be linked based on instructions from either or both of the customers devices 1002 and 1006, based on linked customer device identifiers stored by each of the customers devices 1002 and 1006, and/or using any other linking instructions, techniques, or information known in the art. The linking of the customer devices 1002 and 1006 may provide benefits to the customer 702 prior to, during, and/or after a shopping session, as detailed below.

In an embodiment, the customer devices 1002 and 1006 may belong to the same customer 702, where the customer first device 1002 may be a smart watch that operates as the customer device shopping list display system 200 and the customer second device 1006 may be a mobile phone that provides information to the customer first device 1002 and stores information from the customer first device 1002. For example, the customer 702 may create the shopping list information 1008*a*, the budget information 1008*b*, and the payment information 1008*d* using the customer second device 1006 prior to or during the shopping session. The customer first device 1002 may then link to the customer second device 1006 and retrieve the shopping list information 1008*a*, the budget information 1008*b*, the purchase history information 1008*c*, and the payment information 1008*d* and store that information at the shopping list information 1004*a*, the budget information 1004*b*, the purchase history information 1004*c*, and the payment information 1004*d* for use by the customer first device 1002 operating as the customer device shopping list display system 200 during the shopping session which may allow the customer 702 to create the information using a non-wearable customer device with a large touch screen display, such as the mobile phone, that makes it easier and more convenient than creating that information on a customer device with a small touch screen display, such as the smart watch. In addition, the smart watch wearable customer first device 1002 allows the customer 702 to have their hands free during the shopping session.

In another embodiment, the customer first device 1002 may be the mobile phone that operates as the customer device shopping list display system 200 and the customer second device 1006 may be the smart watch that provides information to the customer first device 1002 and stores information from the customer first device 1002. For example, the customer 702 may create the shopping list information 1008*a*, the budget information 1008*b*, and the payment information 1008*d* using the customer second device 1006 prior to or during the shopping session. The customer first device 1002 may then link to the customer second device 1006 and retrieve the shopping list information 1008*a*, the budget information 1008*b*, the purchase history information 1008*c*, and the payment information 1008*d* and store that information at the shopping list information 1004*a*, the budget information 1004*b*, the purchase history information 1004*c*, and the payment information 1004*d* for use by the customer first device 1002 operating as the customer device shopping list display system 200 during the shopping session.

Figure 11:
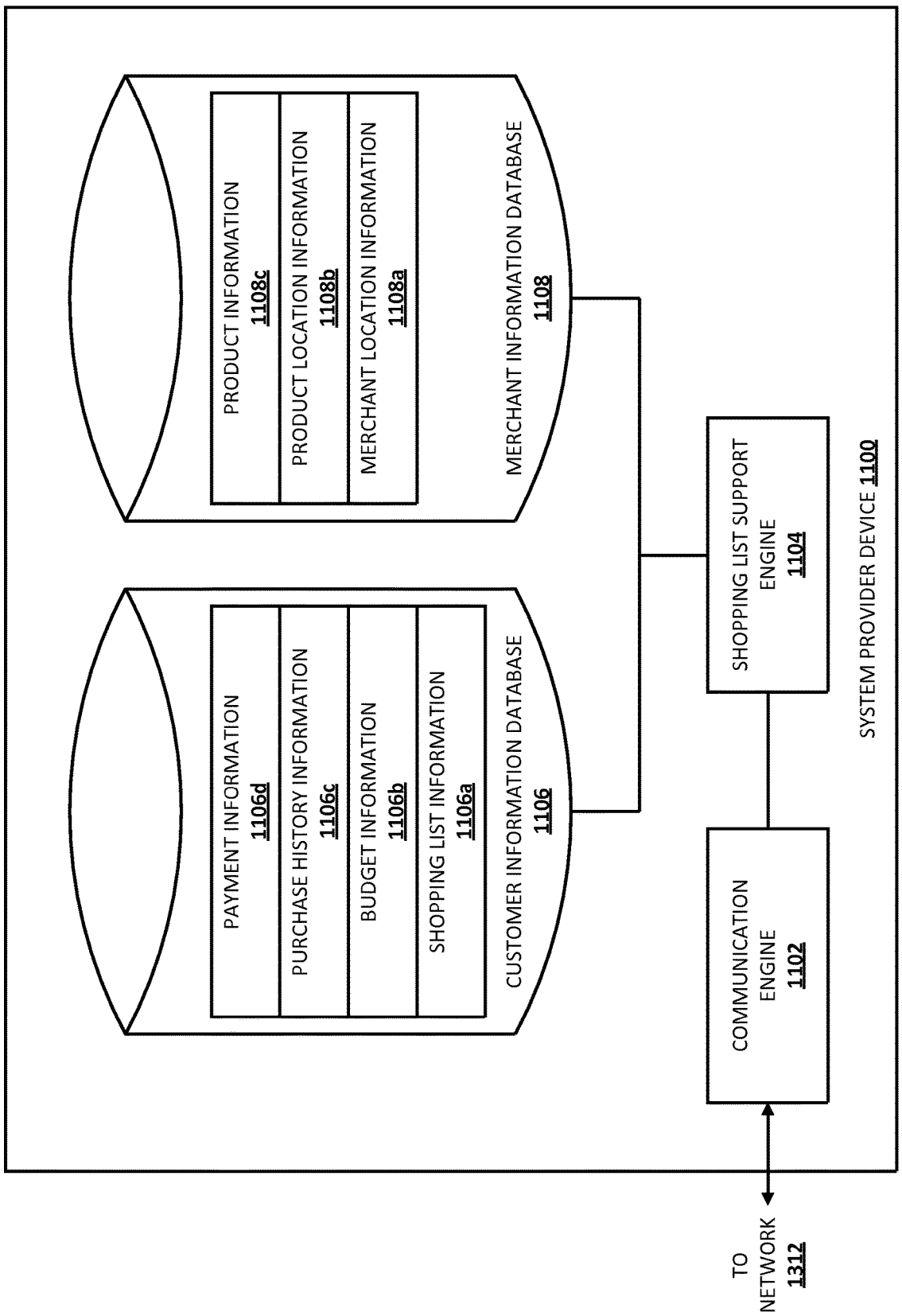
FIG. 11 is a schematic view illustrating an embodiment of a system provider device to provide shopping list support to a customer device shopping list display system.

Referring now to FIG. 11, an embodiment of a system provider device 1100 is illustrated. In an embodiment, the system provider device 1100 operates and is similar to the merchant device 800 and may provide the shopping list support to the customer device shopping list display system 200 and functionality of the customer device shopping list display system 200 to the customer device, as described in detail above. In an embodiment, the system provider device 1100 includes a communication engine 1102 that is communicatively coupled the network 1312 that may communicate with any devices communicatively coupled to the network 1312 (e.g., beacon devices 400, merchant device 800, payment service provider device 1200, customer devices, etc.), and a shopping list support engine 1104 that is communicatively coupled to the communication engine 1102, a customer information database 1106, and a merchant information database 1108, where storage (not illustrated) of the system provider device 1100 may store the customer information database 1106 and the merchant information database 1108. While illustrated as separate databases, the customer information database 1106, and the merchant information database 1108 may be the same database and/or may be linked using techniques known in the art.

In an embodiment, the customer information database 1106 may store shopping list information 1106*a*, budget information 1106*b*, purchase history information 1106*c*, payment information 1106*d*, and/or a variety of other customer information known in the art, any of which may be linked with any other customer information in the customer information database 1106. The shopping list information 1106*a*, the budget information 1106*b*, the purchase history information 1106*c*, the payment information 1106*d*, and/or the variety of other customer information may be retrieved from the customer device shopping list display system 200, created by the system provider device, received from a merchant device 1100, and/or received from a payment service provider device 1200.

In an embodiment, the merchant information database 1108 may store merchant location information 1108*a* that describes the layout of the merchant physical location 300, the location of various items within the merchant physical location 300 (e.g., check-out stands, entrances, parking lots, etc.), product location information 1108*b* that describes the locations of the products that are available at the merchant physical location 300, product information 1108*c* that includes comparable products, prices, discounts, sale prices, rebates, product identifications, and/or a variety of other product information known in the art.

Figure 12:
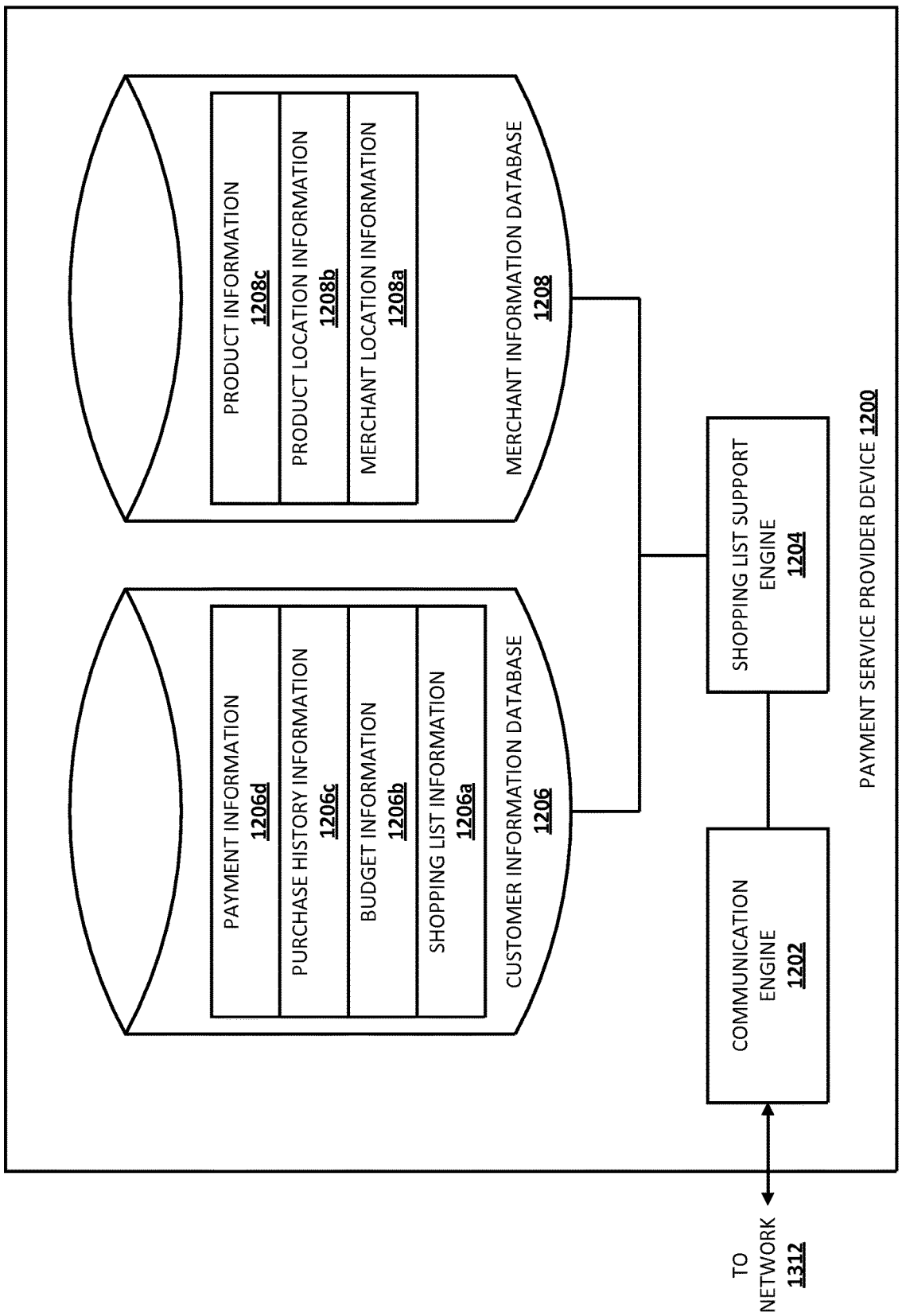
FIG. 12 is a schematic view illustrating an embodiment of a payment service provider device.

Referring now to FIG. 12, an embodiment of a payment service provider device 1200 is illustrated. In an embodiment, the payment service provider device 1200 operates and is similar to the merchant device 800 and the system provider device 1100 and may provide the shopping list support to the customer device shopping list display system 200 and functionality of the customer device shopping list display system 200 to the customer device, as described in detail above. In an embodiment, the payment service provider device 1200 includes a communication engine 1202 that is communicatively coupled to the network 1312 that may communicate with any devices communicatively coupled to the network 1312 (e.g., beacon devices 400, merchant device 800, system provider device 1100, customer devices, etc.), and a shopping list support engine 1204 that is communicatively coupled to the communication engine 1202, a customer information database 1206, and a merchant information database 1208, where storage (not illustrated) of the payment service provider device 1200 may store the customer information database 1206 and the merchant information database 1208. While illustrated as separate databases, the customer information database 1206, and the merchant information database 1208 may be the same database and/or may be linked using techniques known in the art.

In an embodiment, the customer information database 1206 may store shopping list information 1206*a*, budget information 1206*b*, purchase history information 1206*c*, payment information 1206*d*, and/or a variety of other customer information known in the art, any of which may be linked with any other customer information in the customer information database 1206. The shopping list information 1206*a*, the budget information 1206*b*, the purchase history information 1206*c*, the payment information 1206*d*, and/or the variety of other customer information may be retrieved from the customer device shopping list display system 200, created by the payment service provider device 1200, received from a merchant device 800, and/or received from a system provider device 1100.

In an embodiment, the merchant information database 1208 may store merchant location information 1208*a* that describes the layout of the merchant physical location 300, the location of various items within the merchant physical location 300 (e.g., check-out stands, entrances, parking lots, etc.), product location information 1208b that describes the locations of the products that are available at the merchant physical location 300, product information 1208c that includes comparable products, prices, discounts, sale prices, rebates, product identifications, and/or a variety of other product information known in the art.

Figure 13:
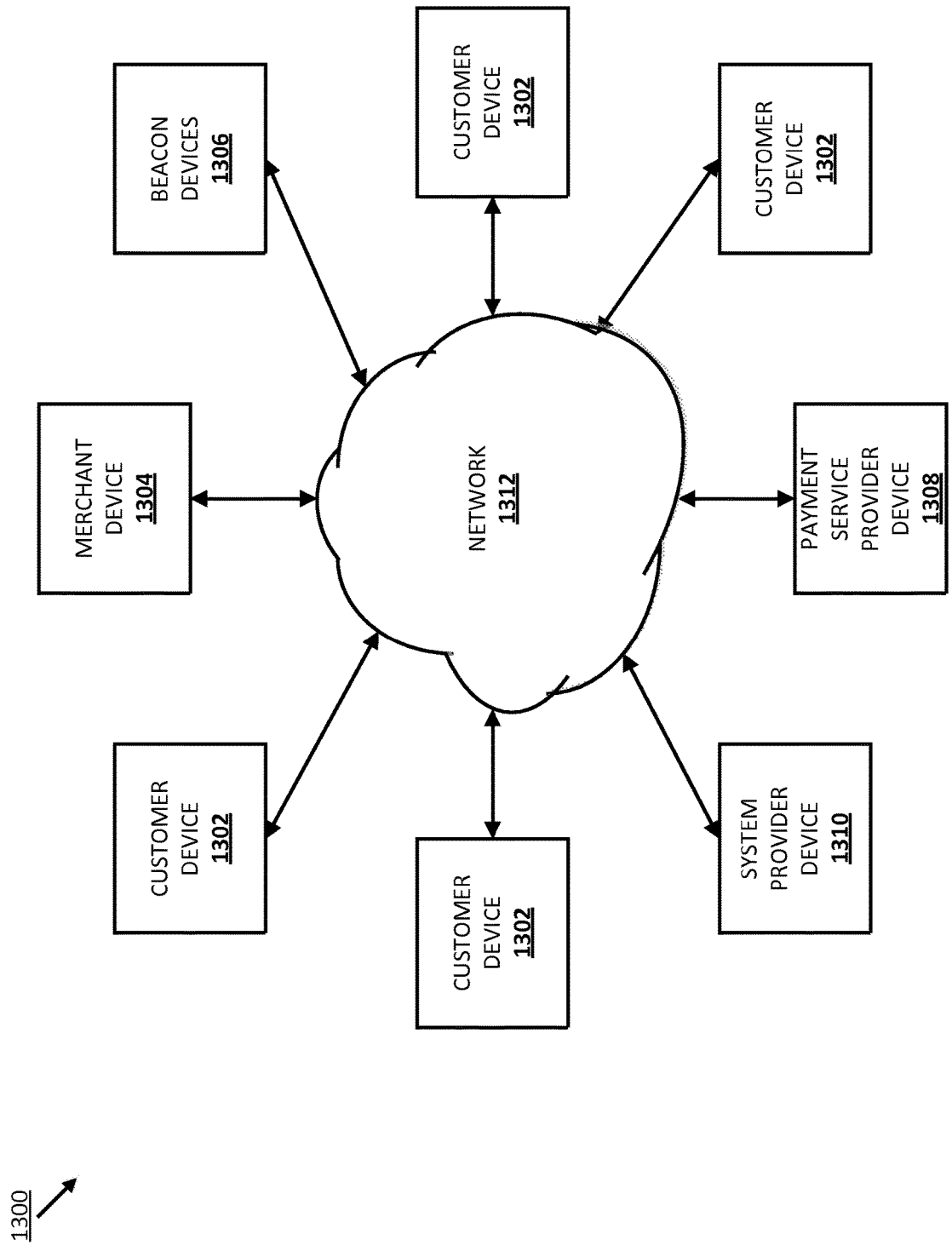
FIG. 13 is a schematic view illustrating an embodiment of a networked system.

Referring now to FIG. 13, an embodiment of a network-based system 1300 for implementing one or more processes described herein is illustrated. As shown, the network-based system 1300 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 13 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1300 illustrated in FIG. 13 includes a plurality of customer devices 1302, a merchant device 1304, a plurality of beacon devices 1306, a payment service provider device 1308, and/or a system provider device 1310 in communication over one or more networks 1312. The customer devices 1302 may be the customer devices discussed above and may be operated by the customers discussed above. The merchant devices 1304 and beacon devices 1306 may be the merchant devices and beacon devices discussed above and may be operated by the merchants discussed above. The payment service provider device 1308 may be the payment service provider devices discussed above and may be operated by a payment service provider such as, for example, PayPal Inc. of San Jose, Calif. The system provider devices 1310 may be the system provider devices discussed above and may be operated by the system providers discussed above.

The customer devices 1302, merchant device 1304, beacon devices 1306, payment service provider device 1308, and/or system provider device 1310 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1300, and/or accessible over the network 1312.

The network 1312 may be implemented as a single network or a combination of multiple networks. For example, in various embodiments, the network 1312 may include the Internet and/or one or more intranets, landline networks, wireless networks, and/or other appropriate types of networks.

The customer devices 1302 may be implemented using any appropriate combination of hardware and/or software configured for wired and/or wireless communication over network 1312. For example, in one embodiment, the customer devices 1302 may be implemented as a personal computer of a user in communication with the Internet. In other embodiments, the customer devices 1302 may be a smart phone, personal digital assistant (PDA), laptop computer, and/or other types of computing devices.

The customer devices 1302 may include one or more browser applications which may be used, for example, to provide a convenient interface to permit the customer to browse information available over the network 1312. For example, in one embodiment, the browser application may be implemented as a web browser configured to view information available over the Internet.

The customer devices 1302 may also include one or more toolbar applications which may be used, for example, to provide user-side processing for performing desired tasks in response to operations selected by the customer. In one embodiment, the toolbar application may display a user interface in connection with the browser application.

The customer devices 1302 may further include other applications as may be desired in particular embodiments to provide desired features to the customer devices 1302. In particular, the other applications may include a payment application for payments assisted by a payment service provider through the payment service provider device 1308. The other applications may also include security applications for implementing user-side security features, programmatic user applications for interfacing with appropriate application programming interfaces (APIs) over the network 1312, or other types of applications. Email and/or text applications may also be included, which allow customer payer to send and receive emails and/or text messages through the network 1312. The customer devices 1302 includes one or more user and/or device identifiers which may be implemented, for example, as operating system registry entries, cookies associated with the browser application, identifiers associated with hardware of the customer devices 1302, or other appropriate identifiers, such as a phone number. In one embodiment, the user identifier may be used by the payment service provider device 1308 to associate the user with a particular account as further described herein.

The merchant device 1304 may be maintained, for example, by a conventional or on-line merchant, conventional or digital goods seller, individual seller, and/or application developer offering various products and/or services in exchange for payment to be received conventionally or over the network 1312. In this regard, the merchant device 1304 may include a database identifying available products and/or services (e.g., collectively referred to as items) which may be made available for viewing and purchase by the customer.

The merchant device 1304 also includes a checkout application which may be configured to facilitate the purchase by the payer of items. The checkout application may be configured to accept payment information from the user through the customer devices 1302 and/or from the payment service provider through the payment service provider device 1308 over the network 1312.

Figure 14:
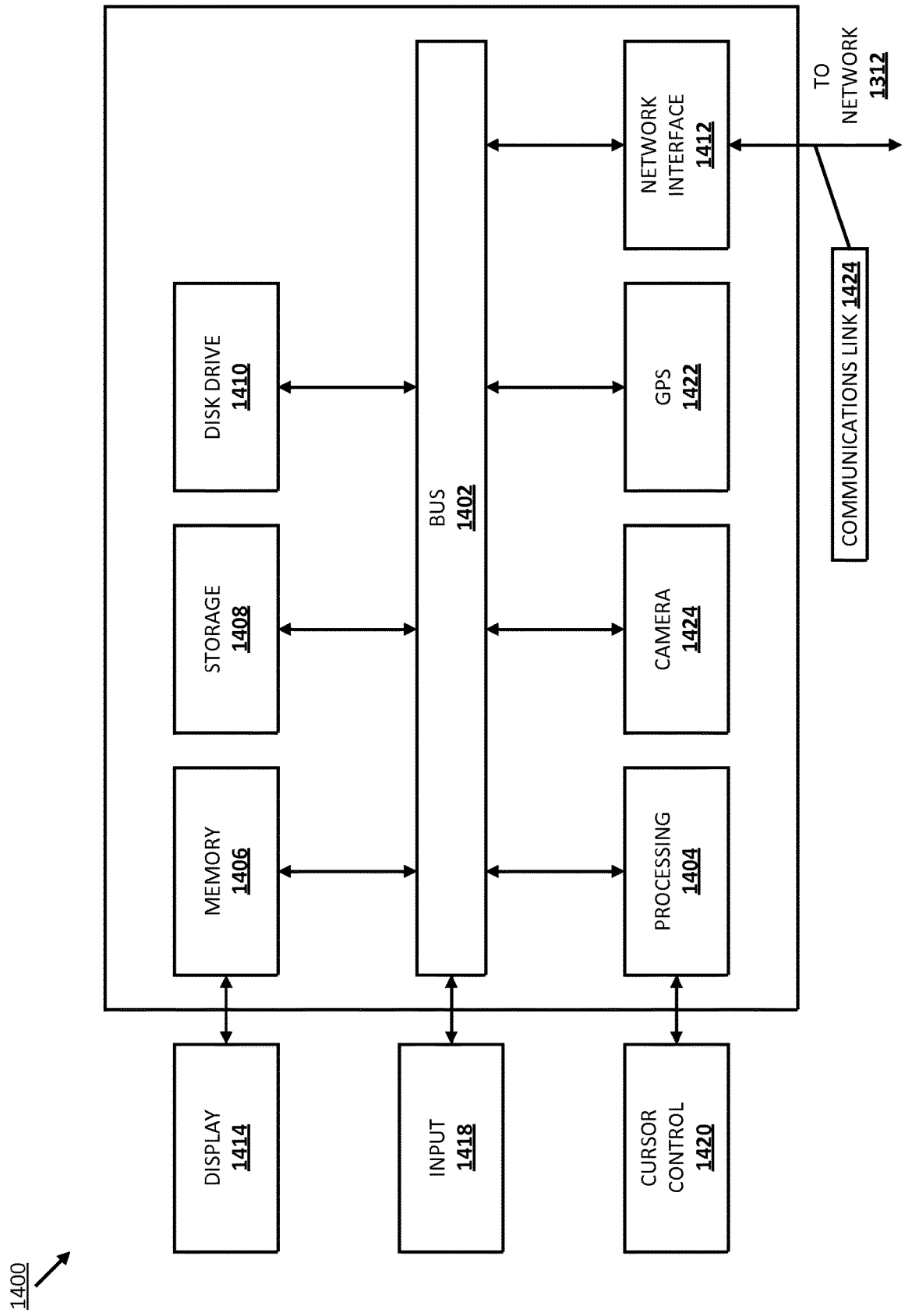
FIG. 14 is a schematic view illustrating an embodiment of a computer system.

Referring now to FIG. 14, an embodiment of a computer system 1400 suitable for implementing, for example, the customer devices 1302, merchant device 1304, beacon devices 1306, payment service provider device 1308, and/or system provider device 1310, is illustrated. It should be appreciated that other devices utilized by customers, merchants, beacon devices, merchant beacon communication devices, payment service providers, and/or system providers in the system discussed above may be implemented as the computer system 1400 in a manner as follows.

In accordance with various embodiments of the present disclosure, computer system 1400, such as a computer and/or a network server, includes a bus 1402 or other communication mechanism for communicating information, which interconnects subsystems and components, such as a processing component 1404 (e.g., processor, micro-controller, digital signal processor (DSP), etc.), a system memory component 1406 (e.g., RAM), a static storage component 1408 (e.g., ROM), a disk drive component 1410 (e.g., magnetic or optical), a network interface component 1412 (e.g., modem or Ethernet card), a display component 1414 (e.g., CRT or LCD), an input component 1418 (e.g., keyboard, keypad, or virtual keyboard), a cursor control component 1420 (e.g., mouse, pointer, or trackball), a location determination component 1422 (e.g., a Global Positioning System (GPS) device as illustrated, a cell tower triangulation device, and/or a variety of other location determination devices known in the art), and/or a camera component 1423. In one implementation, the disk drive component 1410 may comprise a database having one or more disk drive components.

In accordance with embodiments of the present disclosure, the computer system 1400 performs specific operations by the processor 1404 executing one or more sequences of instructions contained in the memory component 1406, such as described herein with respect to the customer devices 1302, merchant device 1304, beacon devices 1306, payment service provider device 1308, and/or system provider device 1310. Such instructions may be read into the system memory component 1406 from another computer readable medium, such as the static storage component 1408 or the disk drive component 1410. In other embodiments, hard-wired circuitry may be used in place of or in combination with software instructions to implement the present disclosure.

Logic may be encoded in a computer readable medium, which may refer to any medium that participates in providing instructions to the processor 1404 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1410, volatile media includes dynamic memory, such as the system memory component 1406, and transmission media includes coaxial cables, copper wire, and fiber optics, including wires that comprise the bus 1402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1400. In various other embodiments of the present disclosure, a plurality of the computer systems 1400 coupled by a communication link 1424 to the network 1312 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1400 may transmit and receive messages, data, information and instructions, including one or more programs (i.e., application code) through the communication link 1424 and the network interface component 1412. The network interface component 1412 may include an antenna, either separate or integrated, to enable transmission and reception via the communication link 1424. Received program code may be executed by processor 1404 as received and/or stored in disk drive component 1410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
determining that a user is within a predetermined distance of a merchant location based on a first communication between a user device of the user and at least a first beacon device of a plurality of beacon devices associated with the merchant location;
accessing a payment account associated with the user generating shopping list information associated with the user based at least in part on a purchase history associated with the payment account, wherein the shopping list information includes a plurality of products, a priority ranking of the plurality of products, and a budget;

obtaining, from the at least first beacon device, product information representing locations and prices of products that are available at the merchant location;

determining, from the plurality of products, a subset of products based on availabilities of the plurality of products at the merchant location, the priority ranking, and the budget, wherein the subset of products is available at the merchant location and a total price for the subset of products is within the budget;

determining a first order for the subset of products corresponding to a first route of traversing the merchant location based at least in part on a first location of the user device;

selecting a first product from the subset of products based on the first order;

displaying, on a display of the user device, first information related to the first product;

receiving a product removal signal that indicates the user has retrieved the first product;

in response to receiving the product removal signal, (i) removing the first information related to the first product from the display and (ii) removing the first product from the shopping list information;

detecting, based on a second communication between the user device and at least a second beacon device of the plurality of beacon devices, that the user device has deviated from the first route;

in response to detecting that the user device has deviated by a predetermined distance from the first route, determining a second order for the subset of products remaining in the shopping list information corresponding to a second route of traversing the merchant location based at least in part on a second location of the user device;

selecting a second product from the subset of products remaining in the shopping list information based on the second order;

causing the user device to display, on the display of the user device, second information related to the second product and a map that shows at least a partial route to the second product;

detecting, based on a third communication between the user device and at least a third beacon device of the plurality of beacon devices, that the user device is within a predetermined distance from a checkout counter of the merchant location;

in response to detecting that the user device is within a predetermined distance from a checkout counter of the merchant location, generating a purchase order based on one or more product removal signals indicating products that have been removed from the shopping list information and payment information associated with the payment account of the user; and performing a payment transaction with a merchant associated with the merchant location based on the purchase order.

2. The system of claim 1, wherein the operations further comprise:
determining a direction from the first location of the user device to the first product within the merchant location using the product information.

3. The system of claim 1, wherein the determining the second order for the subset of products remaining in the shopping list information comprises:
determining that the second product is closest to the second location of the user device based at least in part on the product information.

4. The system of claim 1, wherein the operations further comprise:
receiving a second product removal signal that indicates the user has retrieved the second product;
removing the second product from the shopping list information; and
determining a third order for at least one of the subset of products remaining in the shopping list information based at least in part on the locations of the subset of products remaining in the shopping list information and a third location of the user device after the second product is retrieved by the user within the merchant location.

5. The system of claim 1, wherein the operations further comprise:
determining the first route through the merchant location to acquire the subset of products in the shopping list information based at least in part on the locations of the subset of products in the shopping list information and the first location of the user device.

6. The system of claim 5, wherein the operations further comprise:
in response to detecting that the user device has deviated from the first route, determining the second route through the merchant location to acquire the subset of products in the shopping list information based at least in part on the locations of the subset of products in the shopping list information and the second location of the user device.

7. The system of claim 1, wherein the product removal signal is received from a sensor device of a shopping cart within the merchant location.

8. A method, comprising:
determining, by one or more hardware processors, that a user is within a predetermined distance from a merchant location based on a communication between a wearable device of a user and a first beacon device of a plurality of beacon devices associated with the merchant location;

accessing, by the one or more hardware processors, a payment account associated with the user;

generating, by the one or more hardware processors, shopping list information associated with the user based at least in part on a purchase history associated with the payment account, wherein the shopping list information includes a plurality of products, a priority of the plurality of products, and a budget;

obtaining, by the one or more hardware processors, product information representing locations and prices of products that are available at the merchant location;

determining, by the one or more hardware processors from the plurality of products, a subset of products based on availabilities of the plurality of products at the merchant location, the priority, and the budget, wherein the subset of products is available at the merchant location and a total price for the subset of products is within the budget;

determining, by the one or more hardware processors, a first order for the subset of products corresponding to a first route of traversing the merchant location based at least in part on a first location of the user device;

selecting, by the one or more hardware processors, a first product from the subset of products based on the first order;

displaying, by the one or more hardware processors on a display of the wearable device, first information related to the first product;

receiving, by the one or more hardware processors, a product removal signal that indicates the user has obtained the first product;

in response to receiving the product removal signal, (i) removing, by the one or more hardware processors, the first information related to the first product from the display and (ii) removing, by the one or more hardware processors, the first product from the shopping list information at the customer information database;

detecting, by the one or more hardware processors based on a second communication between the user device and at least a second beacon device of the plurality of beacon devices, that the user device has deviated from the first route;

in response to detecting that the user device has deviated by a predetermined distance from the first route, determining, by the one or more hardware processors, a second order for the subset of products remaining in the shopping list information corresponding to a second route of traversing the merchant location based at least in part on a second location of the wearable device;

selecting, by the one or more hardware processors, a second product from the subset of products remaining in the shopping list information based on the second order;

displaying, by the one or more hardware processors on the display of the wearable device, second information related to the second product;

displaying, by the one or more hardware processors on the display of the wearable device, a map that shows at least a partial route to the second product;

detecting, by the one or more hardware processors based on a third communication between the user device and at least a third beacon device of the plurality of beacon devices, that the user device is within a predetermined distance from a checkout counter of the merchant location;

in response to detecting that the user device is within a predetermined distance from a checkout counter of the merchant location, generating, by the one or more hardware processors, a purchase order based on one or more product removal signals indicating products that have been removed from the shopping list information and payment information associated with the payment account of the user; and performing, by the one or more hardware processors, a payment transaction with a merchant associated with the merchant location based on the purchase order.

9. The method of claim 8, further comprising:
determining a direction from the first location of the wearable device to the first product within the merchant location using the product information.

10. The method of claim 8, wherein the determining the second order for the the subset of products remaining in the shopping list information comprises:
determining that the second product is closest to the second location of the wearable device based at least in part on the product information.

11. The method of claim 8, further comprising:
receiving a second product removal signal that indicates the user has obtained the second product;

removing the second product from the shopping list information; and determining a third order for at least one of the subset of products remaining in the shopping list information based at least in part on the locations of the subset of products remaining in the shopping list information.

12. The method of claim 8, further comprising:
determining the first route through the merchant location to obtain the subset of products in the shopping list information based at least in part on the locations of the subset of products in the shopping list information and the first location of the wearable device.

13. The method of claim 8, further comprising:
in response to detecting that the user device has deviated from the first route, determining the second route through the merchant location to obtain the subset of products in the shopping list information based at least in part on the locations of the subset of products in the shopping list information and the second location of the wearable device.

14. The method of claim 8, wherein the product removal signal is received from one of the plurality of beacon devices.

15. A non-transitory machine-readable medium having stored thereon machine-readable instructions executable to cause a machine to perform operations comprising:

determining that a user is within a predetermined distance from a merchant location based on a first communication between a smart watch of a user and a first beacon device of a plurality of beacon devices associated with the merchant location;

accessing a payment account associated with the user;

generating shopping list information associated with the user based at least in part on a purchase history associated with the payment account, wherein the shopping list information includes a plurality of products, a priority of the plurality of products, and a budget;

obtaining product information representing locations and prices of products that are available at the merchant location;

determining, from the plurality of products, a subset of products based on availabilities of the plurality of products at the merchant location, the priority, and the budget, wherein the subset of products is available at the merchant location and a total price for the subset of products is within the budget;

determining a first order for the subset of products corresponding to a first route of traversing the merchant location based at least in part on a first location of the smart watch;

selecting a first product from the subset of products based on the first order;

displaying, on a display of the smart watch, first information related to the first product;

receiving a product removal signal that indicates the user has retrieved the first product;

in response to receiving the product removal signal, (i) removing the first information related to the first product from the display and (ii) removing the first product from the shopping list information;

detecting, based on a second communication between the user device and at least a second beacon device of the plurality of beacon devices, that the user device has deviated from the first route;

in response to detecting that the user device has deviated by a predetermined distance from the first route, determining a second order for the subset of products remaining in the shopping list information based at least in part on a second location of the smart watch;

selecting a second product from the subset of products remaining in the shopping list information based on the second order;

displaying, on the display of the smart watch, second information related to the second product;

displaying, on the display of the smart watch, a map that shows at least a partial route to the second product;

detecting, based on a third communication between the user device and at least a third beacon device of the plurality of beacon devices, that the user device is within a predetermined distance from a checkout counter of the merchant location;

in response to detecting that the user device is within a predetermined distance from a checkout counter of the merchant location, generating a purchase order based on one or more product removal signals indicating products that have been removed from the shopping list information and payment information associated with the payment account of the user; and performing a payment transaction with a merchant associated with the merchant location based on the purchase order.

16. The non-transitory machine-readable medium of claim 15, wherein the operations further comprise:
determining a direction from the first location of the smart watch to the first product within the merchant location using the product information.

17. The non-transitory machine-readable medium of claim 15, wherein the determining the second order for the subset of products remaining in the shopping list information comprises:
determining that the second product is closest to the second location of the smart watch based at least in part on the product information.

18. The non-transitory machine-readable medium of claim 15, wherein the operations further comprise:
receiving a second product removal signal that indicates the user has removed the second product;
removing the second product from the shopping list information; and
determining a third order for the subset of products remaining in the shopping list information based at least in part on the locations of the subset of products remaining in the shopping list information.

19. The non-transitory machine-readable medium of claim 15, wherein the operations further comprise:
determining the first route through the merchant location to obtain the subset of products in the shopping list information based at least in part on the locations of the subset of products in the shopping list information and the first location of the smart watch within the merchant location.

20. The non-transitory machine-readable medium of claim 15, wherein the product removal signal is received from one of the plurality of beacon devices.

* * * * *